United States Patent [19]
Iida et al.

[11] Patent Number: 5,727,232
[45] Date of Patent: Mar. 10, 1998

[54] DISK SYSTEM HAVING BUFFER WITH DESIGNATED AREA TO BE USED FOR REPEAT ACCESS DATA

[75] Inventors: Ikuko Iida; Yasuhiko Ichikawa, both of Tokyo, Japan

[73] Assignee: Kabushiki Kaisha Toshiba, Kanagawa-ken, Japan

[21] Appl. No.: 463,126

[22] Filed: Jun. 5, 1995

[30] Foreign Application Priority Data

Jun. 6, 1994 [JP] Japan .................... 6-123919

[51] Int. Cl.$^6$ ............................. G06F 12/12
[52] U.S. Cl. .............. 395/876; 395/497.04; 395/438; 395/440; 395/250
[58] Field of Search .................... 395/250, 438, 395/439, 440, 444, 445, 456, 460, 461, 497.04, 427, 471

[56] References Cited

U.S. PATENT DOCUMENTS

| | | | |
|---|---|---|---|
| 5,187,778 | 2/1993 | Yamamoto et al. | 395/250 |
| 5,317,713 | 5/1994 | Glassburn | 395/440 |
| 5,353,425 | 10/1994 | Malamy et al. | 395/471 |
| 5,432,919 | 7/1995 | Falcone et al. | 395/461 |
| 5,497,477 | 3/1996 | Trull | 395/460 |
| 5,539,914 | 7/1996 | Fry et al. | 395/427 |

*Primary Examiner*—Tod R. Swann
*Assistant Examiner*—Gary J. Portka
*Attorney, Agent, or Firm*—Limbach & Limbach L.L.P.

[57] ABSTRACT

A buffer memory is prepared to temporarily store data sequentially read out from consecutive storage positions of a magnetic disk. When a read request is received from a host system, and an HDC reads out the requested data from the magnetic disk, the readout data is written in a buffer area in the buffer memory, which is assigned by a CPU and designated by a buffer management data portion, from the start position to the end position of the area. If the requested data exceeds the capacity of this area, the start address returns to a position indicated by a new start buffer address set in the buffer management data portion which is set by the CPU, e.g., a middle point in the buffer area, and the succeeding readout data is stored in the buffer area from the middle point to the end position. The requested data stored in the buffer memory is sequentially transferred to the host system. In the area extending from the start address, set in the buffer management data portion, to the end position, an area from which data is transferred to the host system is recognized as a free area, and succeeding data is sequentially stored therein by the HDC.

18 Claims, 12 Drawing Sheets

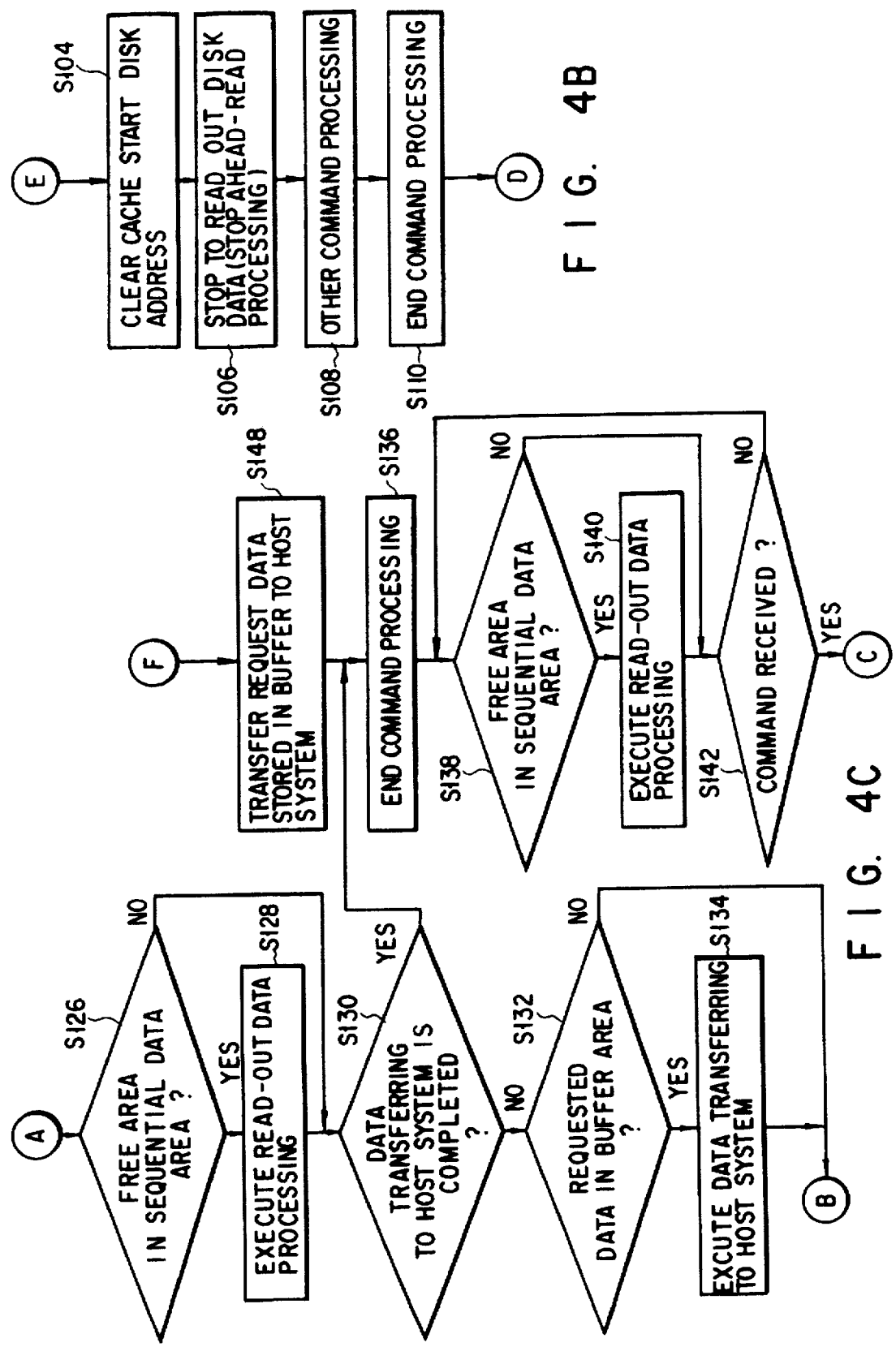

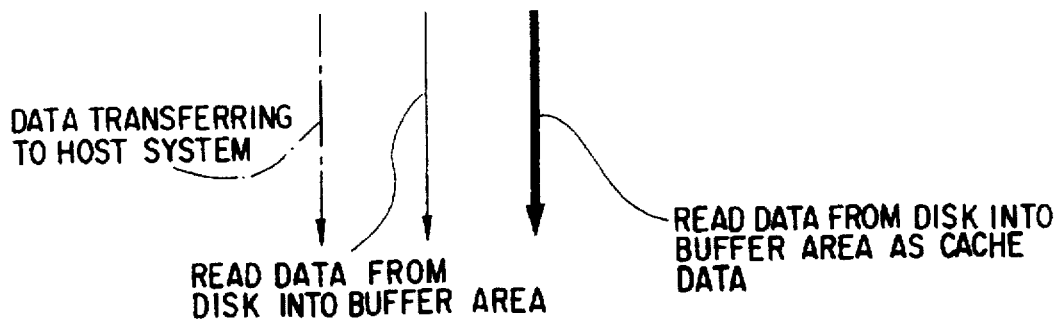
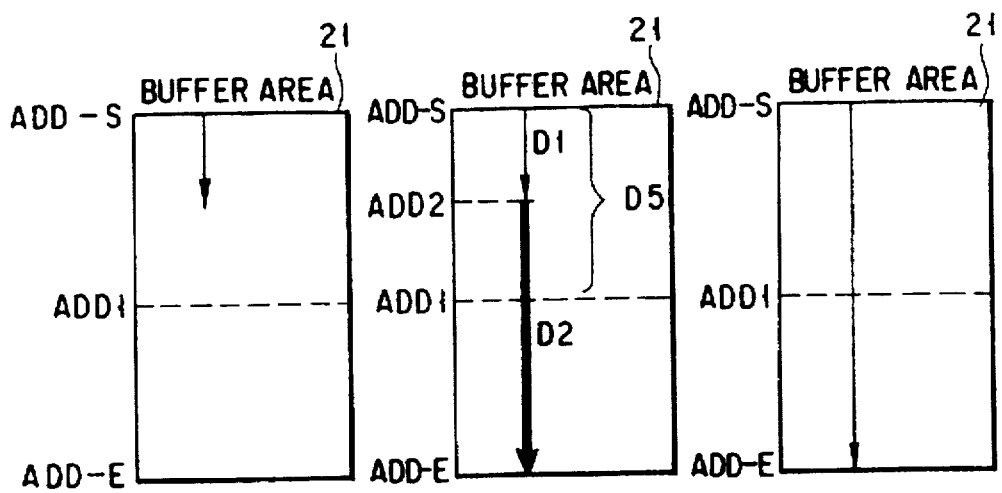
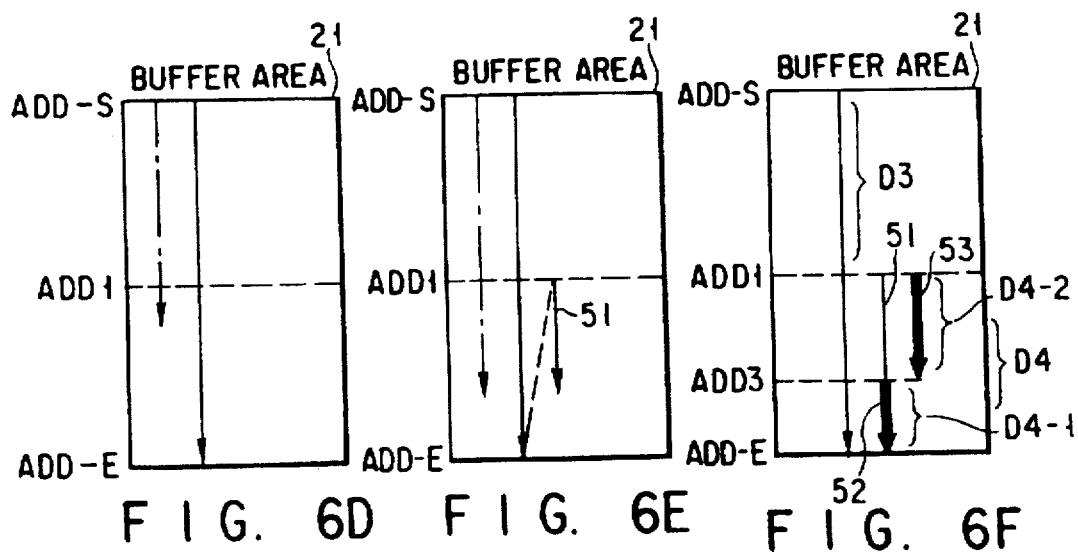

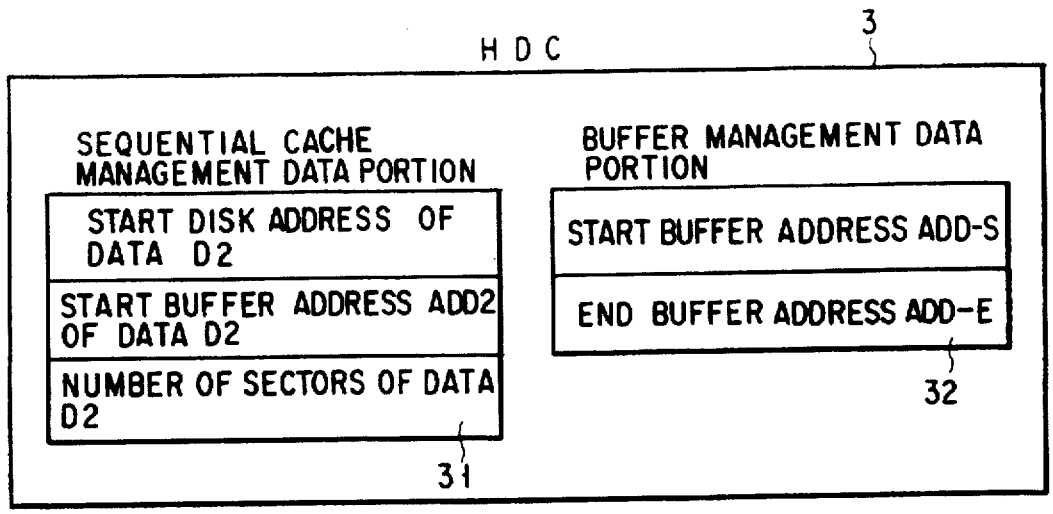
F I G. 7
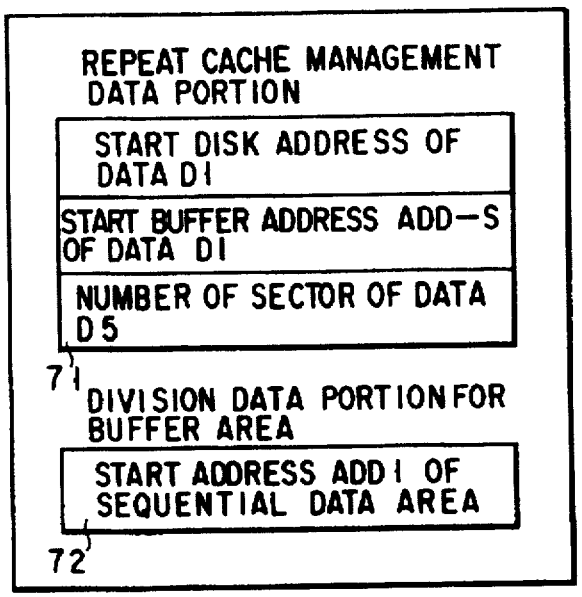
F I G. 8

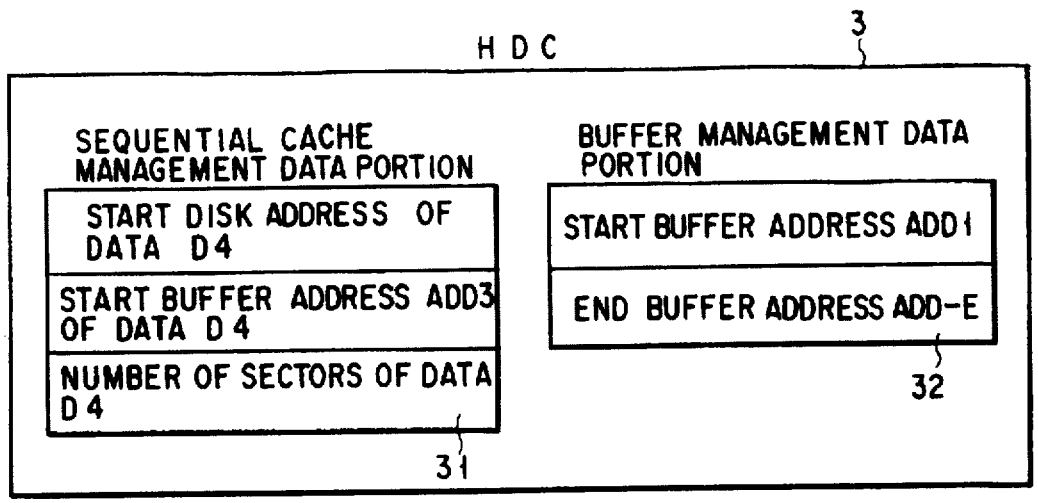
F I G. 9
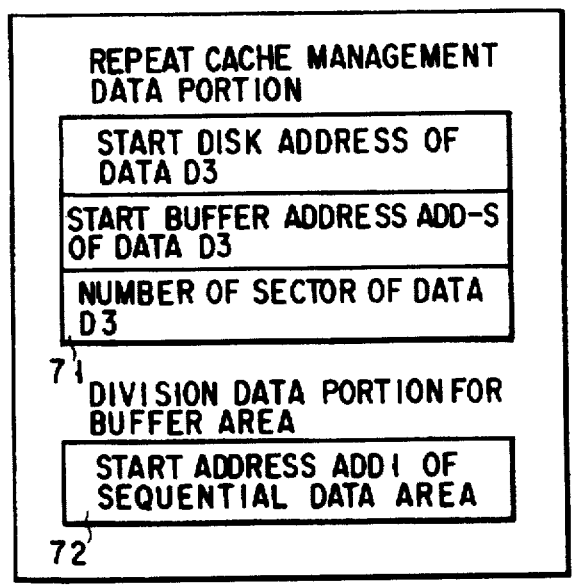
F I G. 10

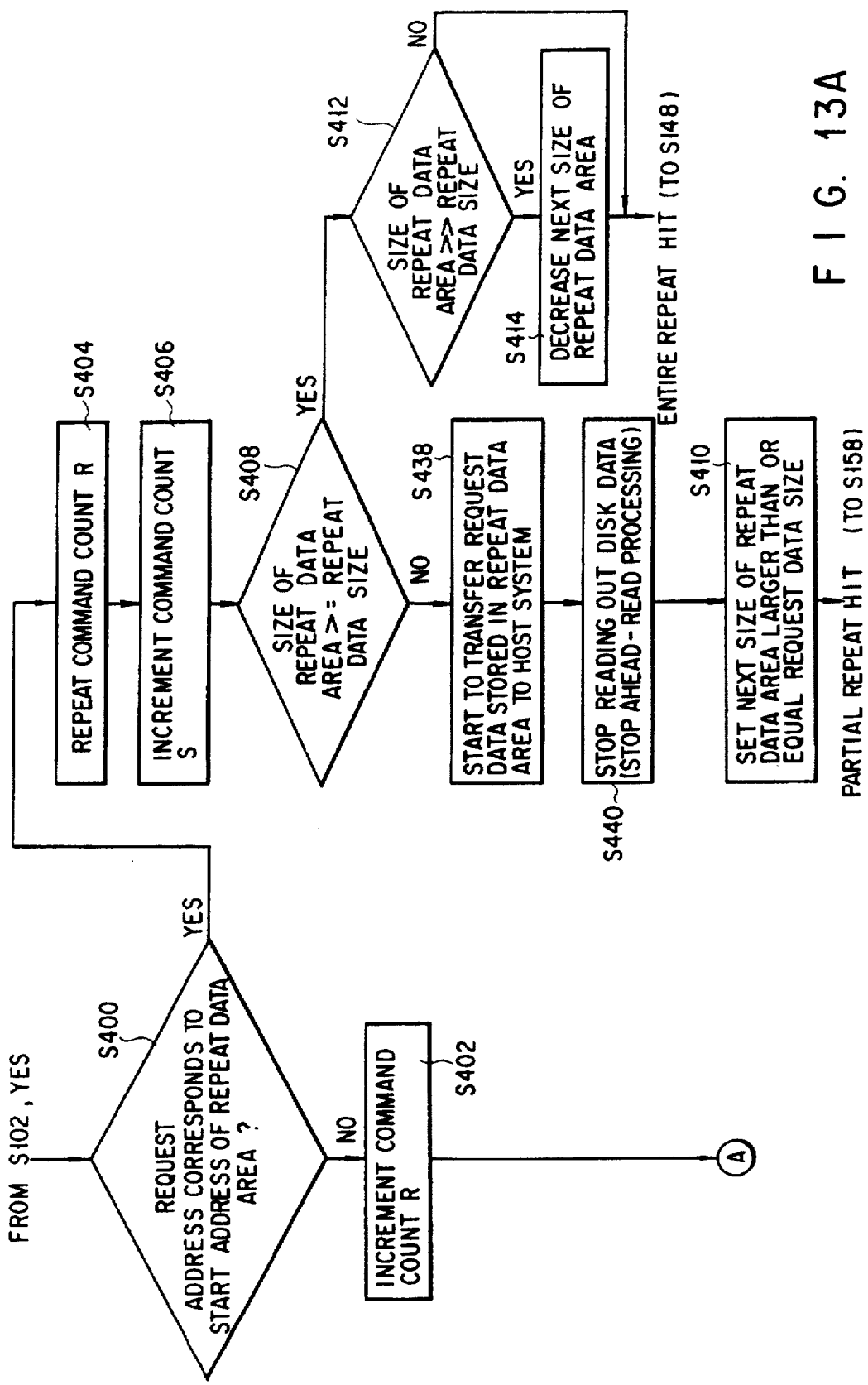
F I G. 13A

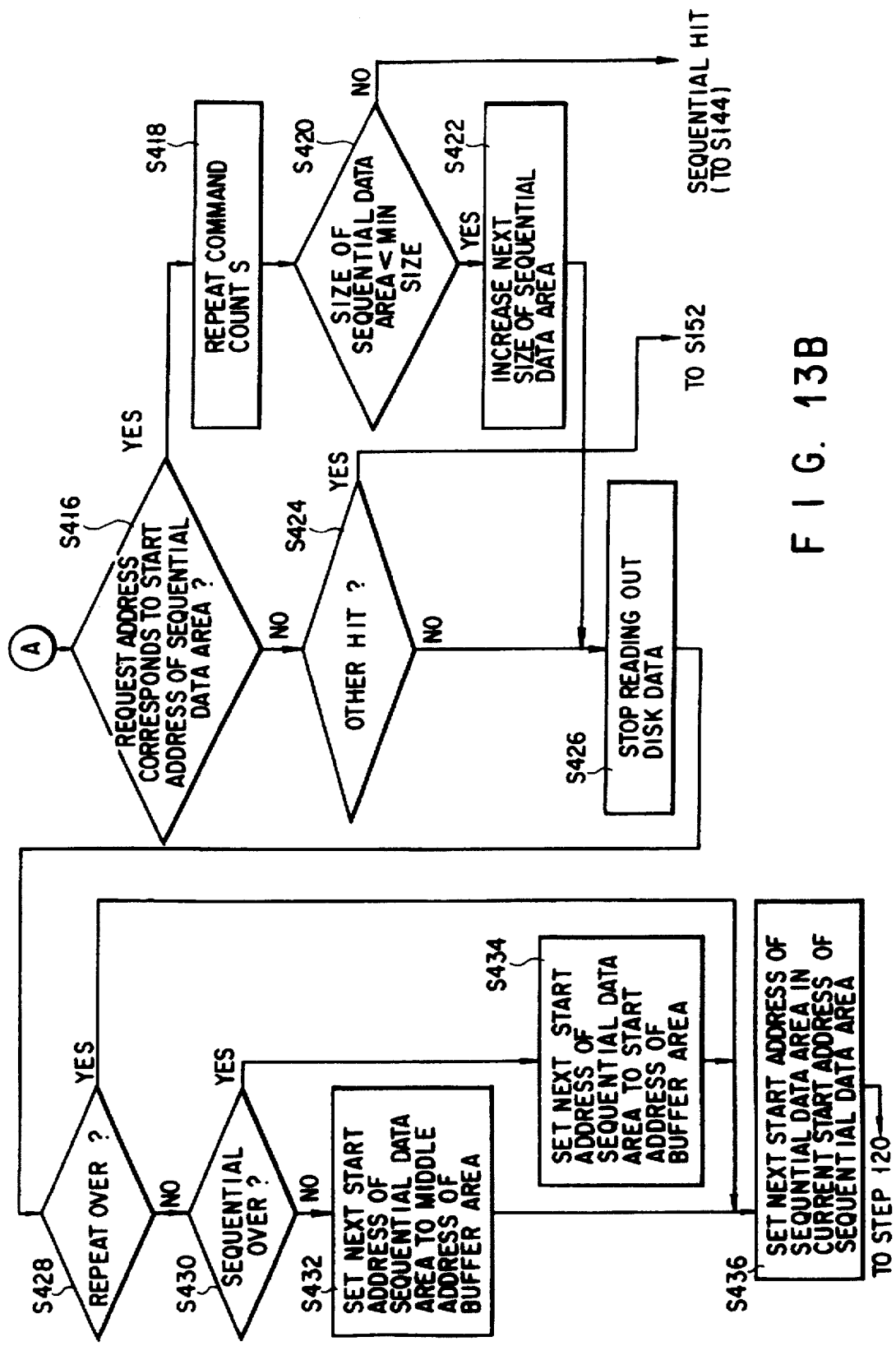
F I G. 13B

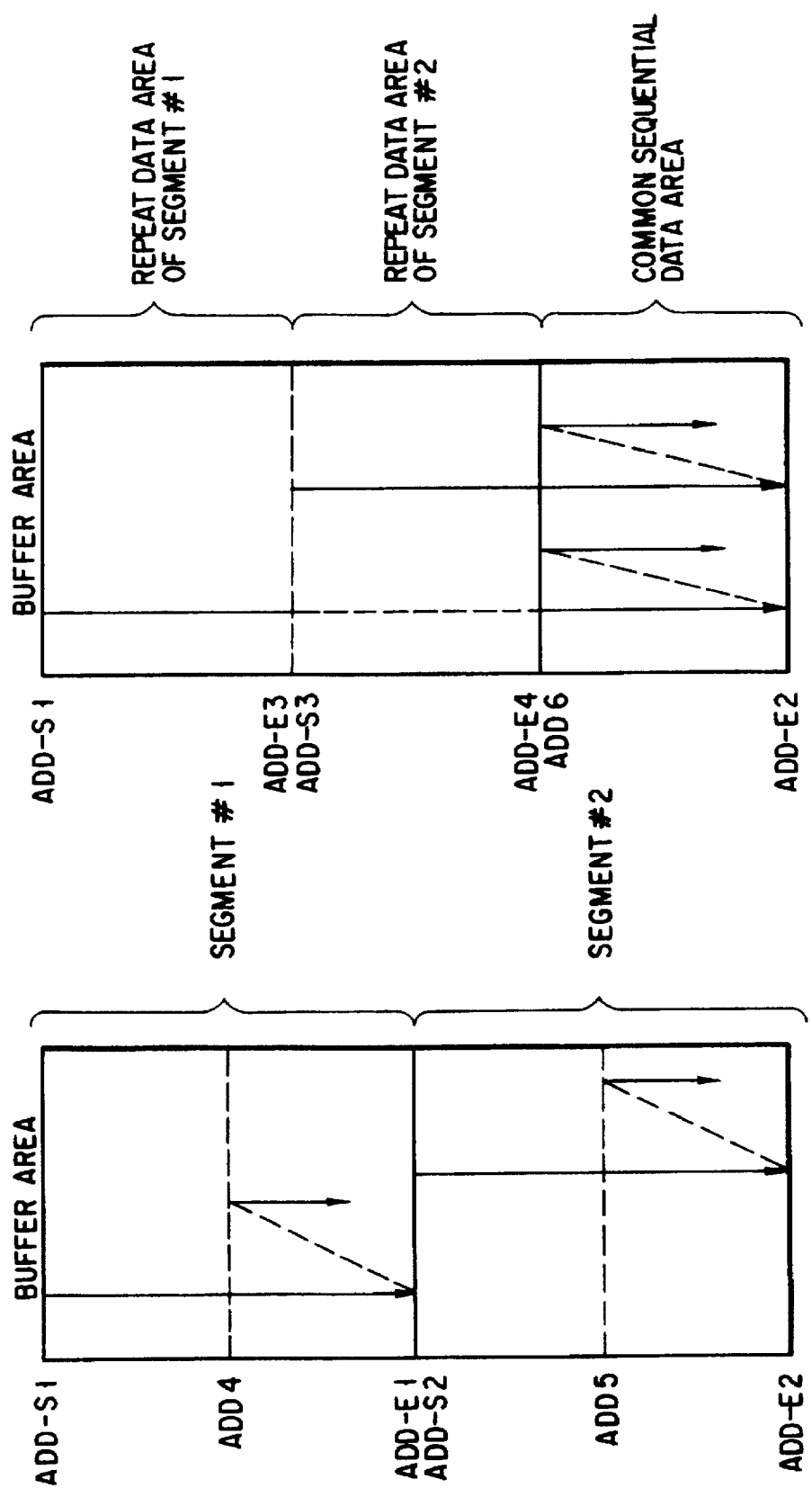

DISK SYSTEM HAVING BUFFER WITH DESIGNATED AREA TO BE USED FOR REPEAT ACCESS DATA

BACKGROUND OF THE INVENTION

1. Field of the Invention

The present invention relates to a disk system for temporarily storing data, read out from a storage medium, in a buffer memory and transferring the data to an external unit (host system) and, more particularly, to a disk system having a read ahead function for readout data (read ahead cache function).

2. Description of the Related Art

Recently, various types of disk apparatuses, each having a buffer memory for temporarily storing data sequentially read out from consecutive storage positions of a disk (storage medium), have been developed.

When the disk controller of a disk apparatus of this type, e.g., the magnetic disk controller of a magnetic disk apparatus, receives a read request from an external unit, the controller checks whether the read-requested data (requested data) is present in a buffer area (segment area) ensured in the buffer memory. If the requested data is not present in the buffer area, read processing is performed to read the requested data from the magnetic disk into the buffer area (segment area).

If the size (request size) of the requested data is smaller than the size of the buffer area (segment area), the magnetic disk controller sequentially reads succeeding data (disk data) into the buffer area (segment area) to capacity.

If the request size is larger than the size of the buffer area (segment area), the magnetic disk controller reads the requested data into the buffer area (segment area) to capacity. Thereafter, a buffer address is automatically returned to the head of the buffer area (segment area) to read succeeding requested data into the buffer area (segment area) from its head. When read processing of the requested data is completed, data (sequential data) following the requested data is read into the buffer area (segment area) to capacity. Note that after the buffer address is returned to the head of the buffer area (segment area), the controller performs data read processing while checking that requested data which has already been read into the corresponding area is transferred to an external unit.

As described above, in a conventional magnetic disk apparatus having a buffer memory (cache), when data is read from the magnetic disk into the buffer area (segment area) in accordance with a read request from an external unit, the requested data designated by the read request is read into the buffer area (segment area) first, and succeeding data is then read thereinto to the end position.

In such a conventional magnetic disk apparatus, when the next read request received from an external unit is a sequential access request (sequential access read request), i.e., for access to data (sequential data) corresponding to a disk address following the data requested by the preceding read request, the sequential data (at least its head portion) has already been read into the buffer area (segment area). For this reason, the sequential data (or at least its head portion) can be immediately extracted from the buffer area (or the segment area) to be transferred to the external unit. With this operation, as compared with the case wherein the requested sequential data (requested data) is read from the magnetic disk into the buffer area, the requested data can be transferred to the external unit at a higher speed, thereby realizing high-speed sequential access read processing.

As described above, in accordance with a read request from an external unit, data (sequential data) following the requested data is read from the magnetic disk into the buffer area (segment area) to capacity. With this operation, if the next read request from the external unit is a sequential access read request, the new requested data (data requested by the sequential access read request) can be extracted from the buffer area (segment area). This function is called a read cache (read ahead cache) function.

Repeat access (repeat access read request) is sometimes requested with respect to a magnetic disk apparatus or the like to request requested data which has been read-requested previously. Assume that in the magnetic disk apparatus having the above read cache function, the next read request from the external unit is a repeat access request (repeat access read request). In this case, if the preceding requested data smaller in capacity than the buffer area (segment area) is read thereinto in accordance with the preceding read request, the succeeding data is merely read into the remaining area of the buffer area (segment area). That is, the target requested data is present from the head of the buffer area (segment area). In this case, therefore, the requested data (at least its head portion) can also be immediately extracted from the buffer area (segment area) to be transferred to the external unit. Therefore, repeat access read processing can be performed at a higher speed than that of the case wherein the requested data is read from the magnetic disk.

Assume that the next request from the external unit is a repeat access request (repeat access read request), and the preceding requested data larger in capacity than the buffer area (segment area) is read thereinto in accordance with the preceding read request. In this case, after data is read into the buffer area (segment area) to capacity, the succeeding data is read into the buffer area (segment area) from its head. For this reason, the data as a repeat access target (or at least the head portion of the data) is lost from the buffer area (segment area).

In the conventional magnetic disk apparatus, therefore, the buffer area (segment area) cannot be effectively used with respect to repeat access read processing after read processing of data larger in capacity than the buffer area (segment area). That is, the read cache function cannot be effectively used. The same problem is posed in disk apparatuses, e.g., magneto-optical disk apparatuses, other than magnetic disk apparatuses.

SUMMARY OF THE INVENTION

It is an object of the present invention to provide a disk system in which after data is read into an assigned buffer area (segment area) to capacity, a position at which succeeding data is read into the buffer area (i.e., a wrap address in the buffer area) is controlled to realize an effective read cache function with respect to a sequential access read request and a repeat access read request from an external unit.

According to a first aspect of the present invention, there is provided a disk system comprising: a disk for storing data; a memory for temporarily storing data sequentially read out from consecutive addresses of the disk; setting means for setting first and second areas in a storage area of the memory; and storage control means for reading out data from the disk in response to a read command issued by a host system to which the disk system is connected, sequentially storing the readout data in the memory from the first area to the second area, and storing succeeding readout data in the second area after the readout data is stored in the entire first and second areas.

According to a second aspect of the present invention, there is provided a disk system comprising: a disk for storing data; a memory for temporarily storing data sequentially read out from consecutive addresses of the disk; setting means for setting first and second areas in a storage area of the memory; hit determination means for, when a read command for requesting read-out processing of data starting from an address of the disk is received from a host system to which the disk system is connected, checking whether the data corresponding to the requested addresses is present in the memory; transfer means for, when the hit determination means determines that the data corresponding to the requested address is present, reading out the data from the memory and transferring the data to the host system; and storage control means for, when the hit determination means determines that the data corresponding to the requested address is not present, reading out the requested data and succeeding data from the disk, sequentially storing the readout data in the first and second areas set in the memory, and storing the succeeding readout data in the second area after the readout data is stored in the entire first and second areas.

According to a third aspect of the present invention, there is provided a disk system comprising: a disk for storing data; a memory for temporarily storing data sequentially read out from consecutive addresses of the disk, the memory having a plurality of segment areas sharing a first storage area; hit determination means for, when a read command for requesting read-out processing of data starting from an address of the disk is received from a host system to which the disk system is connected, checking whether the data corresponding to the requested addresses is present in the memory; transfer means for, when the hit determination means determines that the data corresponding to the requested address is present, reading out the data from the memory and transferring the data to the host system; and storage control means for, when the hit determination means determines that the data corresponding to the requested address is not present, selecting one segment area from the plurality of segment areas, reading out the requested data and succeeding data, sequentially storing the readout data in the selected segment area from the segment area, excluding the first area, to the first area, and storing the succeeding readout data in the first area after the readout data is stored in the entire segment area.

In the above disk systems according to the first to third aspect, the storage control means includes means for storing the succeeding readout data in the second area in which the requested data transferred by the transfer means has been stored.

According to a fourth aspect of the present invention, there is provided a data storage control method in a disk system having a disk for storing data, a memory for temporarily storing data sequentially read out from consecutive addresses of the disk, and means for transferring data to a host system, comprising the steps of: a) setting first and second areas in a storage area of the memory; b) reading out data from the disk in response to a read command issued by the host system to which the disk system is connected; c) sequentially storing the data readout in the step b) in the first and second areas set in the memory; and d) storing succeeding readout data in the second area after the readout data is stored in the entire first and second areas in the step c).

According to a fifth aspect of the present invention, there is provided a data storage control method in a disk system having a disk for storing data, a memory for temporarily storing data sequentially read out from consecutive addresses of the disk, and means for transferring data to a host system, comprising the steps of: a) setting first and second areas in a storage area of the memory; b) when a read command for requesting read-out processing of data starting from an address of the disk is received from the host system to which the disk system is connected, checking whether the data corresponding to the requested address is present in the memory; c) when it is determined in the step b) that the data corresponding to the requested address is present, reading out the data from the memory and transferring the data to the host system; d) when it is determined in the step b) that the data corresponding to the requested address is not present, reading out the requested data and succeeding data from the disk, and sequentially storing the readout data in the memory from the first area to the second area; and e) storing the succeeding readout data in the second area after the readout data is stored in the entire first and second areas.

According to a sixth aspect of the present invention, there is provided a data storage control method in a disk system having a disk for storing data, a memory for temporarily storing data sequentially read out from consecutive addresses of the disk, and means for transferring data to a host system, comprising the steps of: a) setting a plurality of segment areas sharing a first storage area; b) when a read command for requesting read-out processing of data starting from an address of the disk is received from the host system to which the disk system is connected, checking whether the data corresponding to the requested addresses is present in the memory; c) when it is determined in the step b) that the data corresponding to the requested addresses is present, reading out the data from the memory and transferring the data to the host system; d) when it is determined in the step b) that the data corresponding to the requested addresses is not present, selecting one segment area from the plurality of segment areas; e) reading out the requested data and succeeding data from the disk, and sequentially storing the readout data in the segment area selected in the step d) from the segment area, excluding the first area, to the first area; and f) storing the succeeding readout data in the first area after the readout data is stored in the entire segment area.

The above data storage control methods according to the fourth to sixth aspects, each comprise transferring step transferring requested data of the readout data stored in the memory, which is designated by the read command, to the host system, and the storing step includes the step of storing the succeeding readout data in the second area in which the transferred requested data has been stored.

According to the above system and method, when data is read out from a recording medium (disk) in response to a read request from an external unit (host system), the readout data (requested data) is sequentially stored in an assigned storage area of the memory, e.g., the only buffer area (or one segment area selected from a plurality of segment areas) from one end (start position) to the other (end position) (from the first area to the second area). After the readout data (requested data) is stored up to the other end (end position) of the buffer area, i.e., the readout data (requested data) is stored in the entire first and second areas, the readout data (requested data) is read into the second area. In this case, the start address of the second area is set as if the first position of the buffer area (or segment area) were set when, for example, readout data is stored up to the end position of the buffer area (or segment area).

In the above-described manner, after all the requested data is read into the buffer area, data following the requested data is read from the storage medium into the buffer area. Subsequently, the succeeding data is read into the second area of the buffer area (segment area) to capacity while it is checked whether the requested data which has been read into the corresponding area is transferred to the external unit.

After the above buffer storage control, the data (sequential data) following the requested data is present in the second area of the buffer area (segment area), whereas at least head portion of the requested data is present (without being overwritten by the succeeding data) in the first area of the buffer area (segment area).

If, therefore, the next read request from the host system is a sequential access request, since the requested data (at least the head portion) is present in the second area of the buffer area (segment area), a hit occurs. In this case, the requested data (at least the head portion) is immediately read out from the buffer area (segment area) and transferred to the host system.

If the next read request from the external unit is a repeat access request, since the requested data (at least the head portion) is present in the buffer area (segment area) from its start position to the first area, a hit occurs. In this case, the requested data (at least the head portion) is immediately read out from the buffer area (segment area) and transferred to the host system.

As described above, according to the present invention, after data is read into the buffer area (segment area) to capacity, the succeeding data is read into a predetermined area instead of the area starting from its start position (head) of the buffer area (segment area), thereby realizing an effective read cache function with respect to not only a sequential access read request but also a repeat access read request from the host system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 4A to 4C are flow charts for explaining the overall operation of the magnetic disk system of the first embodiment, including processing of responding to a read command;

FIGS. 6A to 6F are views each showing a state wherein disk data is written in the buffer area in response to a read command in the magnetic disk system, and FIG. 6G is a legend for these views;

FIG. 7 is a view showing examples of the contents set in the sequential cache management data portion and the buffer management data portion in FIG. 2;

FIG. 8 is a view showing examples of the contents set in the repeat cache management data portion and the division data portion for buffer area which are held in the RAM in FIG. 3;

FIG. 9 is a view showing examples of contents set in the sequential cache management data portion and the buffer management data portion in FIG. 2;

FIG. 10 is a view showing examples of the contents set in the repeat cache management data portion and the division data portion for buffer area which are held in the RAM in FIG. 3;

FIGS. 13A and 13B are flow charts for explaining buffer area division control in the overall operation of the magnetic disk system of the second embodiment; and FIGS. 14A and 14B are views for explaining data read processing from a magnetic disk into a buffer area in magnetic disk systems according to the third and fourth embodiments of the present invention, in which FIG. 14A shows a state wherein two segments are set in the buffer area, and data is read thereinto in the third embodiment, and FIG. 14B shows a state wherein two segments are set in the buffer area, and data is read thereinto in the fourth embodiment.

DETAILED DESCRIPTION OF THE PREFERRED EMBODIMENTS

Magnetic disk systems according to the first to fourth embodiments of the present invention will be described below with reference to the accompanying drawings.

Figure 1:
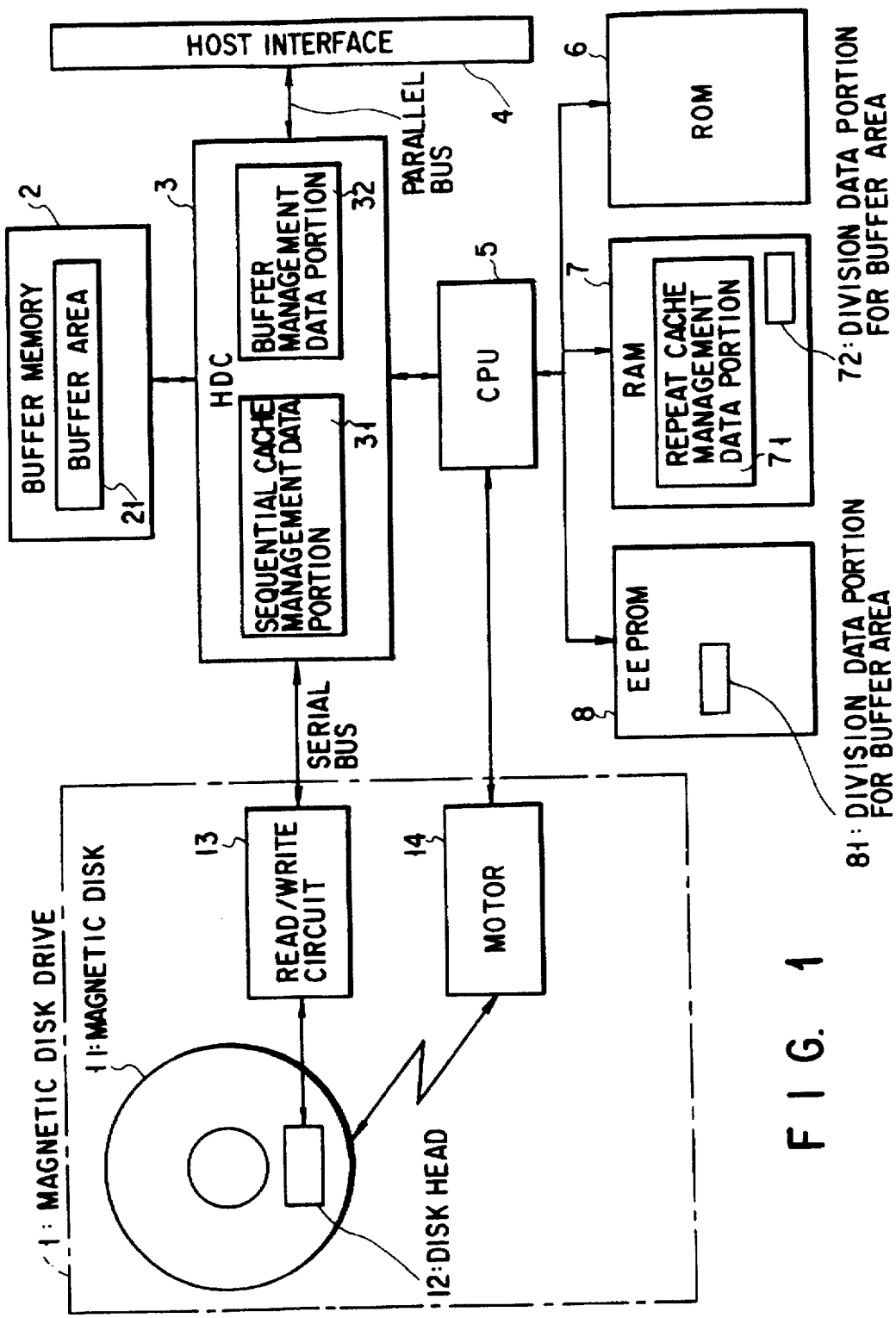
FIG. 1 is a block diagram showing the overall arrangement of a magnetic disk system according to the first embodiment of the present invention.

FIG. 1 shows the overall arrangement of a magnetic disk system (hard disk system) according to the first embodiment of the present invention.

This magnetic disk system comprises a magnetic disk drive 1, a buffer memory 2, a hard disk controller (to be referred to as an HDC hereinafter) 3, a host interface 4, a CPU (central processing unit) 5, a ROM (read-only memory) 6, a RAM (random access memory) 7, and an EEPROM (electrically erasable and programmable read-only memory) 8.

The magnetic disk drive 1 includes a magnetic disk 11 as a storage medium (recording/reproduction medium), a disk head 12 for magnetizing the magnetic disk 11 and detecting a current generated when the disk head passes through a magnetic field on the magnetic disk 11, a read/write circuit 13, and a motor driving circuit 14. The read/write circuit 13 performs a read/write operation with respect to the magnetic disk 11 through the disk head 12 under the control of the HDC 3. The motor driving circuit 14 is used to drive a spindle motor (not shown) for rotating the magnetic disk 11 and to drive a voice coil motor (not shown) for moving the disk head 12.

The buffer memory 2 temporarily stores data sequentially read out from consecutive storage positions (sectors) of the magnetic disk 11. For example, the buffer memory 2 is constituted by a RAM (random access memory) and serves as a cache (read cache). In the first embodiment, a given storage area of the buffer memory 2 is assigned, by the CPU 5, as the only buffer area 21 for temporarily storing data read out from the magnetic disk 11. The size of this buffer area 21 is an integer multiple of a sector size. When the buffer memory 2 is to be managed by a segment scheme (segment cache), a plurality of areas of the buffer memory 2 are respectively assigned as segment areas.

The HDC 3 performs interface control with respect to a host system (not shown), and also controls the magnetic disk drive 1 upon reception of a command from the host system. In addition, the HDC 3 has an interface function for the CPU 5.

The HDC 3 has a buffer control function of storing data, read out from the magnetic disk 11, in the buffer memory 2 and reading out data from the buffer memory 2 and transferring it to the host system. This buffer control function includes a buffer storage control function of storing data, read out from the magnetic disk 11, in the buffer area 21 assigned to the buffer memory 2 to capacity, and then storing succeeding readout data in the buffer area 21, starting from a start buffer address (a predetermined storage position between the start position and end position of the buffer area 21 in this embodiment, e.g., a storage position ADD1 of the buffer area 21) designated by the CPU 5 to the end position of the area. For the sake of descriptive convenience, the area extending from the start position of the buffer area 21 to the storage position ADD1 is defined as a repeat data area, and the area extending from the storage position ADD1 to the end position of the buffer area 21 is defined as a sequential data area. The above buffer control function also includes a control function of reading out data from the sequential data area of the buffer memory 2 to transfer the data to the host system, and then treating the area, in which the transferred data has been stored, as a free area to sequentially read data from the magnetic disk 11 into the free area. Note that the storage position ADD1 (to be described later) is changed in accordance with a predetermined command from the host system (first embodiment).

Figure 2:
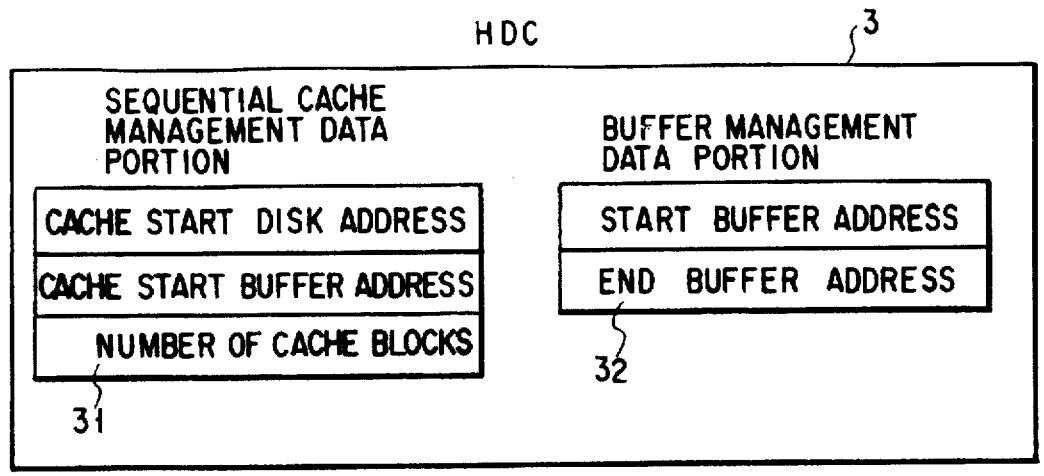
FIG. 2 is a view for explaining a sequential cache management data portion and a buffer management data portion which are held in the HDC of the magnetic disk system in FIG 1.

The HDC 3 has a cache management data setting portion for sequential access (sequential cache management data portion) 31 to use the buffer area 21 in the buffer memory 2 as a cache for sequential access read processing. As shown in FIG. 2, the start disk address (cache start disk address), on the magnetic disk 11, of sequential data stored in the buffer area 21, the start buffer address (cache start buffer address) on the buffer memory 2, and the number of cache blocks (sectors) are set in the sequential cache management data portion 31.

The HDC 3 also has a buffer management data portion 32. As shown in FIG. 2, the buffer address (start buffer address) of the start position (storage position) of the buffer area 21 and the buffer address (end buffer address) of the end position of the buffer area 21 are set in the buffer management data portion 32. In addition, when data read out from the magnetic disk 11 is read into the buffer area 21 to the end position, a buffer address indicating the storage position ADD1 is set, as a start buffer address, in the HDC 3.

The host interface 4 performs interface processing between the host system and the HDC 3.

The CPU 5 performs control operations other than those set in the HDC 3. More specifically, the CPU 5 controls the motor driving circuit 14 and also performs the following control (buffer storage control). After the HDC 3 reads data in the buffer area 21 to capacity, the CPU 5 sets the storage position ADD1, as the buffer address (start buffer address) of the head of the area into which succeeding data is to be read, in the buffer management data portion 32 in the HDC 3.

The ROM 6 stores firmware programs for the CPU 5.

Figure 3:
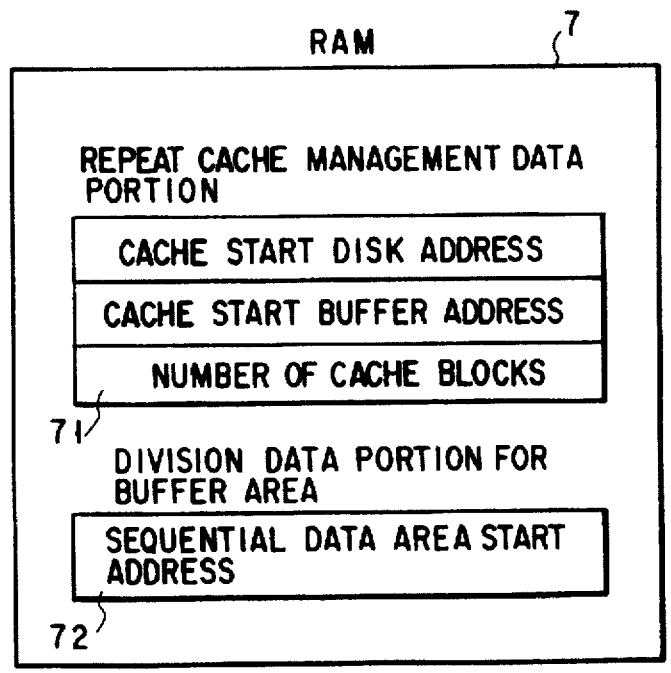
FIG. 3 is a view for explaining a repeat cache management data portion and a division data portion for buffer area which are held in the RAM of the magnetic disk system in FIG. 1.

The RAM 7 is a memory which is capable of a read/write operation and is used as the work memory of the CPU 5. The RAM 7 incorporates a cache management data setting portion (repeat cache management data portion) 71 to use the buffer area 21 in the buffer memory 2 as a cache for read processing (e.g., repeat access read processing) other than sequential access processing. As shown in FIG. 3, the start disk address (cache start disk address), on the magnetic disk 11, of data stored in the buffer area 21 from its start position, a start buffer address (cache start buffer address) on the buffer memory 2, and the number of cache blocks (sectors) are set in the repeat cache management data portion 71.

The RAM 7 also includes a division data portion 72 for buffer area to manage the boundary between the repeat data area and the sequential data area included in the buffer area 21. The division data portion 72 stores the storage position ADD1, i.e., the start address (buffer address) of the sequential data area.

The overall operation of the disk system of the first embodiment will be described next with reference to the flow chart of FIGS. 4A to 4C by exemplifying the case wherein various commands, especially a read command, are issued.

When the power switch of the magnetic disk system shown in FIG. 1 is turned on, the CPU 5 performs predetermined initialization processing first, and the system then waits for a request (command) from the host system (step S100). When some command is issued by the host system, and the HDC 3 receives this command via the host interface 4, the HDC 3 notifies the CPU 5 of the reception of the command. In response to this notification, the CPU 5 checks whether the received command is a read command (step S102).

If the received command is not a read command (NO in step S102), the data respectively set in the sequential cache management data portion 31 and the repeat cache management data portion 71 in accordance with the previously issued command (if the command is a read command) are cleared by the CPU 5 (step S104). In this case, first of all, the CPU 5 instructs the HDC 3, which has received the command which is not a read command, to clear the data in the incorporated sequential cache management data portion 31, i.e., the disk address (cache start disk address) from which the sequential data area of the buffer area 21 starts, the buffer address (cache start buffer address) from which the sequential data area starts, and the number of sectors (cache blocks) of disk data stored in the sequential data area. The HDC 3 then clears various data and notifies the CPU 5 of the reception of a command other than a read command. In response to this notification from the HDC 3, the CPU 5 clears the data in the repeat cache management data portion 71 in the RAM 7, i.e., the disk address (cache start disk address) from which the repeat data area of the buffer area 21 starts, the buffer address (cache start buffer address) from which the repeat data area starts, and the number of sectors (cache blocks) of disk data stored in the repeat data area.

The HDC 3 also clears various data. If the previously issued command is a read command, ahead-read processing (read ahead processing of data recorded on the magnetic disk 11) may be in progress. In this case, the HDC 3 stops the ahead-read processing according to an instruction by the CPU 5 (step S106).

Subsequently, the HDC 3 and/or the CPU 5 executes processing corresponding to the received command. If, for example, the received command is a write command, write processing is executed (step S108). When the processing corresponding to the received command is completed (step S110), the flow returns to step S100, and the magnetic disk system is set in a command wait state.

If it is determined in step S100 that the received command is a read command (YES in step S102), the buffer memory 2 is used as a cache (read cache) in the magnetic disk system, and determination processing for various hits is performed.

In this embodiment, conditions for hits in the read cache are classified into a condition for a sequential hit (in the case of sequential access read processing, in which data read processing from a disk address next to the data requested by the preceding read command is requested), a condition for a repeat hit (in the case of repeat access read processing, in which data read processing from the same disk address as that indicated by the preceding read command is requested), and a condition for other hits (in the case wherein any data cached in the buffer memory 2 is requested).

A read request (read command) sent from the host system to the magnetic disk system in FIG. 1 is received by the HDC 3 via the host interface 4. This read request is also sent from the HDC 3 to the CPU 5.

The CPU 5 performs hit determination processing to check whether the read request is a repeat access read request, i.e., checks the presence/absence of a repeat hit (step S112). This determination processing is performed by comparing the request disk address with the cache start disk address held in the repeat cache management data portion 71 in the RAM 7 used by the CPU 5. If the cache start disk address stored in the repeat cache management data portion 71 does not coincide with the disk address designated by the command received from the host system, the CPU 5 determines that the received read command is not a repeat access read request (repeat hit). The CPU 5 notifies the HDC 3 of repeat access read processing, i.e., a repeat mishit.

In response to the notification from the CPU 5, the HDC 3 performs hit determination processing to check whether the read request from the host system is a sequential access read request, i.e., checks the presence/absence of a sequential hit (step S114). This determination processing is performed by comparing the request disk address with the cache start disk address held in the sequential cache management data portion 31 in the HDC 3.

If the addresses do not coincide with each other, the HDC 3 determines that the received command is not for sequential access read processing (sequential hit), and notifies the CPU 5 of corresponding information. The CPU 5 then checks the presence/absence of any of other hits (step S116). This determination processing is performed by checking whether the request disk address falls within the disk address range obtained by the cache start disk address and the number of cache blocks (sectors) held in the repeat cache management data portion 71 in the RAM 7.

If the cache start address falls within the above disk address range, the CPU 5 determines that the received command is not any of other hits (NO in step S116). When the previously received command is a read command, ahead-read processing may be in progress, and so is data read processing from the magnetic disk 11. For this reason, the CPU 5 instructs the HDC 3 to stop the ahead-read processing (step S118). In addition, the CPU 5 sets a buffer address (start buffer address) ADD-S of the start position of the buffer area 21 and a buffer address (end buffer address) ADD-E of the end position of the buffer area 21 in the buffer management data portion 32 of the HDC 3 to assign an area in the buffer memory 2 as the only buffer area 21.

In response to the stop instruction for the ahead-read processing, the HDC 3 calculates the hit address of the next sequential access and the like on the basis of the disk address designated by the received read command (step S120). More specifically, the HDC 3 calculates the disk address of data following the requested data, a buffer address of the buffer area 21 at which the succeeding data is recorded, and the number of sectors of data stored for sequential access. The calculated disk address, buffer address, and number of sectors are set in the sequential cache management data portion 31 as a cache start disk address, a cache start buffer address, and the number of cache blocks, respectively. When setting of data in the sequential cache management data portion 31 is completed, the HDC 3 notifies the CPU 5 of the completion of this data setting operation.

In response to this notification, the CPU 5 sets the disk address designated by the received command in the repeat cache management data portion 71 as a cache start buffer address, and also sets, in the repeat cache management data portion 71, a buffer address of the buffer area 21 at which the data corresponding to the disk address designated by the read command is recorded, as a cache start buffer address, and the total number of sectors of the data written in the buffer area 21, as the number of cache blocks (step S122).

Subsequently, the CPU 5 sets the amount of data to be read out from the magnetic disk 11 (step S124). The read amount set in this case is larger in size than the buffer area 21 of the buffer memory 2. The set size is stored in a predetermined area of the RAM 7. When setting of the read amount is completed, the CPU 5 notifies the HDC 3 of this completion.

In response to this notification, the HDC 3 reads the requested data, designated by the read command received in step S100, from the magnetic disk 11 into the buffer area 21, and transfers the requested data to the host system, thus performing data read-out and transfer processing (steps S126 to S134). The HDC 3 reads the data (requested by the host system) designated by the read request from the host system from the magnetic disk 11 into the buffer area 21 from its start position (head), indicated by the start buffer address set in the buffer area 21 in the HDC 3, to the end position of the buffer area 21. In this case, as will be described in detail later, when the disk data is completely read into the buffer area 21 from the start position to the end position thereof (ADD-S to ADD-E), the next readout data is stored at the buffer address designated by the sequential start address held in the division data portion 72 of the RAM 7. In this case, the sequential area start address is stored at the start buffer address of the buffer management data portion 32 held in the HDC 3. In this data read-out and transfer processing, when the data read into the sequential data area is transferred, the area in which the transferred data has been stored is determined as a free area, and data is sequentially written in this free area. Since the data read amount set in step S124 is considerably large, the HDC 3 generally keeps reading disk data from the magnetic disk 11 into the buffer area 21 until transfer processing of the requested data to the host system is completed.

Figure 4A:
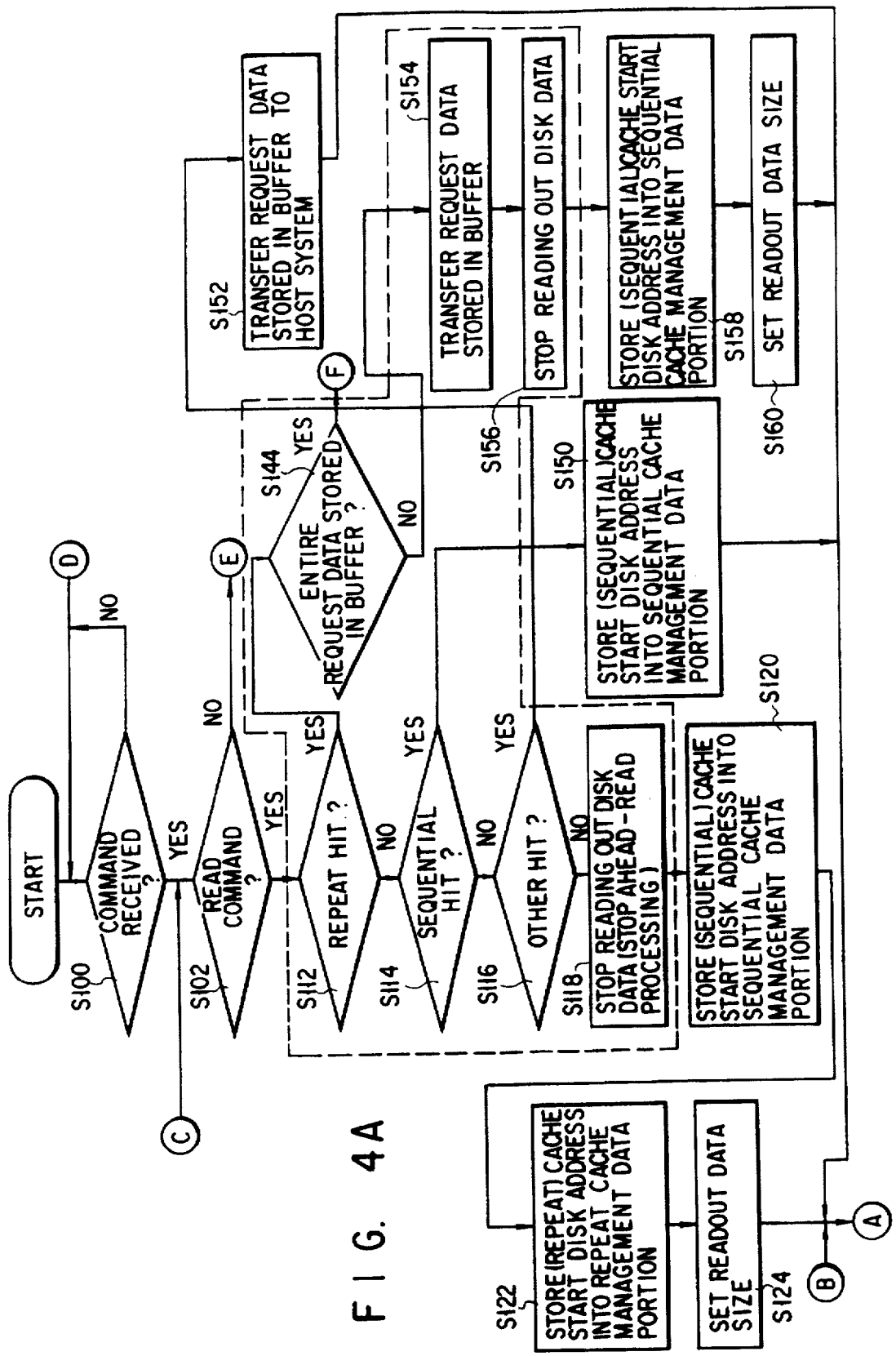

As shown in FIGS. 4A to 4C, in this data read-out and transfer processing, first of all, it is checked whether there is a free area in the sequential data area of the buffer area 21 (step S126). If there is a free area in the sequential data area, the HDC 3 reads out data from the magnetic disk 11, and stores the data in the buffer area 21 from the start position to the end position thereof (step S128). As described above, if writing of data in the buffer area 21 from the start position to the end position thereof (ADD-S to ADD-E) is completed, the HDC 3 starts writing the data from the start address of the sequential data area, i.e., the sequential area start address set in the division data portion 72. Therefore, once the data is stored in the repeat data area in step S128, even if the requested data is larger in size than the buffer area 21, the data is stored as repeat data, which is to be read out when a read command is issued by the host system, without being deleted (i.e., the area in which the data has been stored is not recognized as a free area upon data transfer to the host system).

Note that the data read-out processing in step S128 is performed by a predetermined amount, e.g., one-sector data, similar to subsequent transfer processing to the host system.

When read-out processing of the disk data in step S128 is completed, or if it is determined in step S126 that there is no free area in the sequential data area, the HDC 3 checks whether all the requested data designated by the read command is transferred to the host system (step S130).

If transfer processing of the requested data to the host system is not completed (NO in step S130), the HDC 3 checks whether the requested data is stored in the buffer area 21 (step S132). If the requested data is stored in the buffer area 21, the HDC 3 transfers the requested data to the host system (step S134). As described above, however, transfer processing of the requested data to the host system is performed by a predetermined data amount, e.g., a data amount corresponding to one sector.

When transfer processing of the requested data to the host system is completed (step S134), or if the requested data is not present in the buffer area 21 (NO in step S132), the flow returns to step S126 again. The HDC 3 then checks whether there is a free area in the sequential data area.

When all the requested data is transferred to the host system (YES in step S130), the HDC 3 notifies the host system of the completion of processing corresponding to the read command received in step S100 (step S136).

With this operation, a bus connecting the magnetic disk 11 to the host system is released. Subsequently, if there is a free area in the sequential data area of the buffer area 21, the HDC 3 waits for a command from the host system, and performs ahead-read processing (steps S138 to S142).

This ahead-read processing is executed as follows. As shown in FIGS. 4A to 4C, upon notifying the host system of the completion of processing corresponding to the received read command, the HDC 3 checks whether there is a free area in the buffer area 21 (step S138). If there is a free area in the buffer area 21, the HDC 3 reads out, from the magnetic disk 11, disk data following the requested data, i.e., the disk address, or data following the data for sequential access which is stored in the buffer area 21, and writes the readout data in the buffer area 21 (step S140). The data readout processing in step S140 is also executed by a predetermined data amount, similar to the data read-out processing in step S128. Thereafter, the HDC 3 checks whether a new command is received via the host interface 4 (step S142). If no command is received, the flow returns to step S138 to check the presence/absence of a free area.

If there is no free area in the buffer area 21 (NO in step S138), the HDC 3 is set in a command wait state.

Note that if the system is designed to supply an interrupt signal to the HDC 3 in response to a received command, the data read-out processing in step S140, i.e., ahead-read processing, may not be executed by a predetermined amount, but may be executed until no free area is present in the buffer area 21, as long as no interrupt signal is supplied.

If it is determined in step S112 that the disk address designated by the received read command coincides with the cache start disk address held in the repeat cache management data portion 71, the CPU 5 determines a repeat hit (YES in step S112), and notifies the HDC 3 of the corresponding information. In this case, the repeat hit indicates that the data requested by the read command is stored in the repeat area of the buffer area 21. In response to the information indicating the determination of the repeat hit, sent from the CPU 5, the HDC 3 starts transfer processing of transferring the requested data stored in the repeat area of the buffer area 21 to the host system in accordance with the cache start buffer address held in the repeat cache management data portion 71.

If the repeat hit is determined in the repeat hit determination (YES in step S112), the CPU 5 determines that whether the requested data designated by the received read command is smaller in size or equal to the repeat data area of the buffer area 21 (step S144). That is, it is determined both that a start address designated by the transferred read command from the host system is equal to a start disk address stored in the repeat cache management data portion 71 and that the requested data designated by the read command is smaller in size or equal to the repeat data area. If YES in step S114, the requested data designated by the read command is entirely stored in the repeat data area. In this case, the HDC 3 executes the transfer processing of the requested data (step S148).

If a start address designated by the transferred read command from the host system is not equal to a start disk address stored in the repeat cache management data portion 71, and the requested data designated by the read command is not smaller in size of equal to the repeat data area (NO in step S144), the data transferring of the requested data only stored in the repeat data area is executed (step S154), and the remained requested data, i.e. the succeeding data following the requested data stored in the repeat data area are readout from the magnetic disk 11. This is because that the data had been stored in the sequential data area may not being succeeding following the requested data stored in the repeat data area. In that readout data processing, the CPU 5 instructs the HDC 3 to stop ahead-read processing and executes processing in order to read out the remained requested data from the magnetic disk 11 and store the readout data into the sequential data area. That is, the CPU 5 stores a start disk address of the requested data to be stored in the sequential data area into the sequential cache management data portion 71 (step S158), and sets the amount of data to be read out from the magnetic disk 11 (step S160).

If it is determined in step S114 that the disk address designated by the received read command coincides with the cache start disk address held in the sequential cache management data portion 31, the HDC 3 determines a sequential hit (YES in step S114). Thereafter, a cache start disk address and a cache start buffer address which are used for the next sequential read processing are calculated, together with the number of sectors (cache blocks) of data stored in the sequential data area, on the basis of the disk address designated by the read command and the size of the requested data. These calculated data are set in the sequential cache management data portion 31 (step S150). Thereafter, the HDC 3 executes the above data read-out and transfer processing (steps S126 to S134).

If it is determined in step S116 that the disk address designated by the received read command falls within the address range corresponding to the data stored in the buffer area 21, the CPU 5 determines a hit other than a repeat hit and a sequential hit (YES in step S116). Subsequently, the HDC 3 starts transferring the requested data from the buffer area 21 to the host system, and executes the above data readout and transfer processing.

The above-described processing is executed as processing corresponding to commands, especially a read command, in the magnetic disk system.

Figure 5:
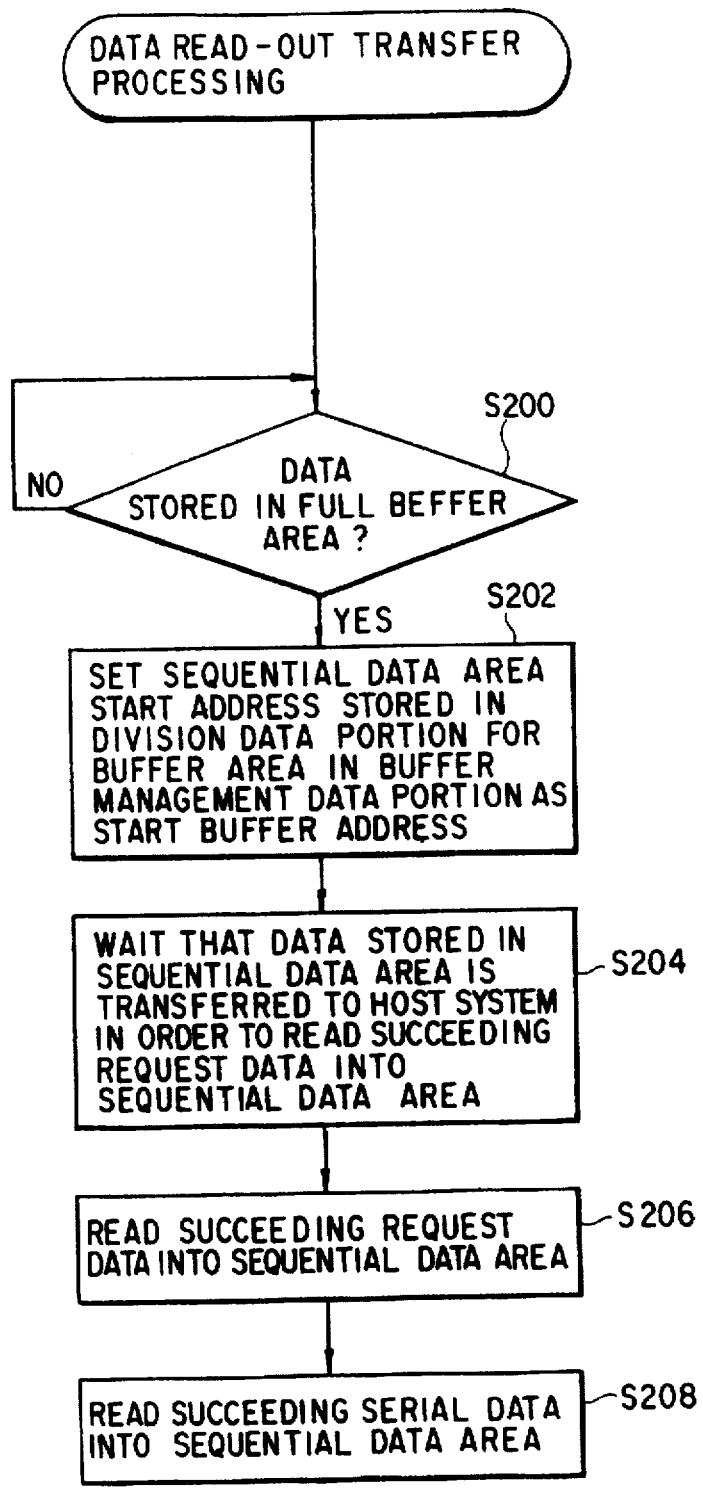
FIG. 5 is a flow chart for explaining data read processing from a magnetic disk into a buffer area in the magnetic disk system of the first embodiment.

The operation and effects of this magnetic disk system will be described in detail next with reference to FIGS. 5 to 10. FIG. 5 is a flow chart showing the operational transition of the magnetic disk system based on the above data read-out and transfer processing (steps S126 to S134) and the above ahead-read processing (steps S138 to S142) from a different viewpoint. FIGS. 6A to 6F are views for explaining a state wherein data is read into the buffer area 21. FIGS. 7 to 10 are views for explaining examples of data stored in the sequential cache management data portion 31 and the buffer management data portion 32, which are held in the HDC 3, and the repeat cache management data portion 71 and the division data portion 72, which are held in the RAM 7.

As described above, even if a received command is a read command, if none of a repeat hit, a sequential hit, and other hits occurs, i.e., a mishit occurs, the data read-out and transfer processing in steps S126 to S134 is performed in the buffer management data portion 32 after setting of various data is completed (steps S118 to S124). With this operation, the HDC 3 reads the requested data corresponding to the read command from the magnetic disk 11 into the buffer area 21 from the start position (head), indicated by the start buffer address ADD-S, to the end position of the buffer area 21. The solid arrow in FIG. 6A indicates such a data read state in the buffer area 21.

A case wherein data requested by the host system is smaller in size than the repeat data area of the buffer area 21 will be described below.

If the data request by the host system is smaller in size than the repeat data area of the buffer area 21, the CPU 5 instructs the HDC 3 to continuously read data following the requested data from the magnetic disk drive 1 (magnetic disk 11) into the buffer area 21.

In response to this instruction, the HDC 3 reads the requested data into the buffer area 21 from its start position. Thereafter, the succeeding data following the disk address is read into the buffer area 21 from an address next to the buffer address, at which the last portion of the requested data has been stored, to the end position of the buffer area 21. FIG. 6B shows the buffer area subjected to such processing. As shown in FIG. 6B, after requested data D1 smaller in size than the repeat data area of the buffer area 21 is read into the buffer area 21 from its start position, succeeding data D2 (data corresponding to an address following the requested data D1, i.e., data corresponding to a sequential address) is read into the buffer area 21 from an address ADD2 next to the preceding buffer address, at which the last portion of the requested data D1 has been stored, to the end position of the buffer area 21 (i.e., up to the capacity of the buffer area 21), as indicated by the thick arrow in FIG. 6B.

In this case, as described above, the HDC 3 sequentially reads out the requested data, read into the buffer area 21, from the head of the buffer area 21 and transfers the data to the host system via the host interface 4, while reading the data into the buffer area 21. That is, the requested data D1 written in the buffer area 21 is sequentially transferred to the host system.

At this time, the disk address of the head (head sector) of the succeeding data (the data corresponding to the sequential address) D2 following the requested data D1 read into the buffer area 21, the buffer address ADD2 indicating the start position (head position) at which the HDC 3 starts reading the data D2 into the buffer area 21, and the number of sectors of the data D2 (the number of sectors of the succeeding data D2 read into the buffer area 21 to capacity, following the requested data D1) have been respectively set as a cache start disk address, a cache start buffer address, and the number of cache blocks in the sequential cache management data portion 31 of the HDC 3 in step S120 described above. FIG. 7 shows the contents of the sequential cache management data portion 31 and the buffer management data portion 32 in the HDC 3.

In the repeat cache management data portion 71 of the RAM 7, the disk address (request address) of the head (head sector) of the requested data D1 read into the buffer area 21, the buffer address ADD-S indicating the start position at which the HDC 3 starts reading the data D1 into the buffer area 21, and the number of sectors of sum data D5 (equal in size to the repeat data area) of the requested data D1 and the succeeding data D2 have been respectively set as a cache start disk address, a cache start buffer address, and the number of cache blocks. FIG. 8 shows the contents of the repeat cache management data portion 71 in the RAM 7 in this case.

The above-described operation is performed when data requested by the host system is smaller in size than the repeat data area of the buffer area 21.

A case wherein data requested by the host system is larger in size than the repeat data area of the buffer area 21 will be described next.

The CPU 5 instructs the HDC 3 to keep reading the requested data into the buffer area 21 to capacity.

In response to the instruction from the CPU 5, the HDC 3 reads the requested data into the buffer area 21 to capacity, as indicated by the solid line in FIG. 6D (step S200). When the buffer area 21 is filled with the data, the HDC 3 notifies the CPU 5 of the corresponding information.

In response to the notification from the HDC 3, the CPU 5 sets the start address of the sequential data area, set in the division data portion 72 of the RAM 7, in the buffer management data portion 32 of the HDC 3 as a start buffer address for reading the succeeding requested data into the buffer area 21 (step S202). Assume, in this case, that the address ADD1 is set, as the start address of the sequential data area, in the division data portion 72 in advance.

When the data requested by the host system is read into the buffer area 21 to capacity, the sequential data area start address set in the division data portion 72, more specifically the boundary position at which the buffer area 21 divided according to a sector size, is set, as a start buffer address, in the buffer management data portion 32 in step S202. Note that this sequential data area start address is variable and is changed in the direction of the start or end position of the buffer area 21 in accordance with a specific command from the host system.

When the start buffer address ADD1 is set in the buffer management data portion 32 in the HDC 3, the CPU 5 instructs the HDC 3 to read the succeeding data requested by the host system into the buffer area 21 from the start buffer address ADD1 set in the buffer management data portion 32.

In order to read the succeeding requested data into the buffer area 21 from the buffer address ADD1, the HDC 3 waits until the preceding requested data which has already been read into the corresponding portion is transferred to the host system, as indicated by the chain line in FIG. 6D (step S204). As the data read into the portion starting from the buffer address ADD1 is sequentially transferred to the host system, the HDC 3 reads the succeeding requested data into the buffer area 21 from the buffer address ADD1 of the buffer area 21 to its end position, as indicated by a sold arrow 51 in FIG. 6E (step S206). Note that this read processing is performed in units of a predetermined data amount, i.e., in units of sectors, and hence is performed every time transfer of one-sector data of the previously read data is confirmed, as described above. This applies to read processing of data (data corresponding to a sequential address) following the requested data, which will be described later.

When the data requested by the host system is read into the buffer area 21 from the buffer address ADD1 in the above manner, the HDC 3 performs the following data read processing (read processing of data corresponding to a sequential address) such that an area of the buffer area 21 which extends from the buffer address ADD1 to the end position is filled with the data (data corresponding to the sequential address) following the requested data (step S208).

First of all, the HDC 3 reads data (data corresponding to the sequential address) D4-1 corresponding to an address following the requested data into the buffer area 21 from an address ADD3 next to the buffer address, at which the last portion of the requested data is read into the buffer area 21, to the end position of the buffer area 21, as indicated by a thick arrow 52 in FIG. 6F. When the data D4-1 corresponding to the sequential address is read into the buffer area 21 to the end position, the HDC 3 reads data D4-2 corresponding to a sequential address following the data D4-1 into the buffer area 21 at the buffer address ADD1 and the subsequent addresses, while checking whether the requested data (indicated by the sold arrow 51) previously read into the buffer area 21 from the buffer address ADD1 is transferred to the host system, as indicated by a thick arrow 53 in FIG. 6F. This read processing is performed up to a buffer address immediately before the buffer address ADD3 at which the data D4-1 corresponding to the sequential address is stored, as shown in FIG. 6F. That is, the read processing is performed until the area of the buffer area 21 which extends from the buffer address ADD1 to the end position is filled with data D4 corresponding to the sequential data and consisting of the data D4-1 and D4-2, as indicated by arrows 52 and 53 in FIG. 6F.

With the above processing, in the buffer area 21, as shown in FIG. 5F, the data D3 (requested data D3) as the head portion of the data requested by the host system is stored in the area extending from the start position to the address immediately before the buffer address ADD1, whereas the succeeding data (data corresponding to the sequential address) D4 consisting of the data D4-1 and D4-2 is stored in the area extending from the buffer address ADD1 to the end position, in the directions indicated by the arrows 52 and 53, in the order of the arrows 52 and 53.

At this time, in the sequential cache management data portion 31 of the HDC 3, the disk address of the head (head sector) of the data (data following the requested data) D4 corresponding to the sequential address and read into the buffer area 21 at the buffer address ADD1 and the subsequent addresses, the buffer address ADD3 indicating the start position at which the HDC 3 starts reading the data D4 into the buffer area 21, and the number of sectors of the data D4 are respectively set as a cache start disk address, a cache start buffer address, and the number of cache blocks. FIG. 9 shows the contents of the sequential cache management data portion 31 and the buffer management data portion 32 in the HDC 3 in this case.

In the repeat cache management data portion 71 of the RAM 7, the disk address of the head (head sector) of the requested data D3 (data of the requested data which is stored in the area extending from the start position of the buffer area to the buffer address ADD1) read into the buffer area 21, the buffer address ADD-S indicating the start position at which the HDC 3 starts reading the data D3 into the buffer area 21, and the number of sectors of the requested data D3 are respectively set as a cache start disk address, a cache start buffer address, and the number of cache blocks. FIG. 10 shows the contents of the repeat cache management data portion 71 in the RAM 7 in this case.

Assume that requested data corresponding to a read request and data following the requested data (data corresponding to a sequential address) are stored in the magnetic disk 11, and a new request is sent from the host system. The operation of the magnetic disk system in this case will be described next. That is, in this case, the buffer area 21 is set in the state shown in FIG. 6B or 6F by the data read-out and transfer processing and the ahead-read processing shown in FIGS. 4A to 4C, and a new read request (read command) is sent from the host system to the magnetic disk system.

As described above, when a command is sent to the magnetic disk system, the HDC 3 and the CPU 5 are notified of the corresponding information. If this command is a read command (YES in step S102), the CPU 5 compares the requested disk address with the cache start disk address set in the repeat cache management data portion 71 in the RAM 7 to check whether the requested read processing is repeat access read processing (repeat read processing).

If the requested read processing is repeat access read processing, the CPU 5 determines that the requested data (or at least the head portion of the requested data) indicated by the read request currently received from the host system is present in the head portion of the buffer area 21, and a repeat hit has occurred (step S112).

If, for example, the read request sent from the host system is a repeat access read request while the contents of the buffer area 21 are set in the state shown in FIG. 6B, the data D5 in FIG. 6B in the buffer area 21 are hit.

In this case, since the address ADD-S is set, as a cache start buffer address, in the repeat cache management data portion 71 in the RAM 7 as shown in FIG. 8, the CPU 5 instructs the HDC 3 to sequentially read out and transfer the data D5, stored in the area of the buffer area 21 which starts from the head address ADD-S, from the address ADD-S by the requested number of sectors (blocks) (step S144).

If a data shortage occurs with only the data D5 (YES in step S146), request data corresponding to the data shortage is read into the buffer area 21 from the address ADD1 to the end position (see FIG. 6E). Thereafter, data corresponding to a sequential address following the requested data is read into the buffer area 21 from the address ADD1 to the end position (see FIG. 6F).

If the read request sent from the host system is a repeat access read request while the contents of the buffer area 21 are set in the state shown in FIG. 6F, the data D3 shown in FIG. 6F in the buffer area 21 is hit.

Conventionally, in read processing of requested data exceeding the capacity of the buffer area 21, after the data is read into the buffer area 21 up to the end position, data is read into the buffer area 21 from the start position (as in the first read processing) to the end position of the buffer area 21 again. For this reason, the first requested data (or at least the head portion of the first requested data) read into the buffer area 21 is lost, and no hit occurs if the next read command is a repeat access read request.

In contrast to this, in the first embodiment, even if the requested data exceeding the capacity of the buffer area 21 shown in FIG. 6F is read into the buffer area 21, since the head portion D3 of the requested data is left in the area of the buffer area 21 which extends from the start position of the buffer area 21 to the address immediately before the address ADD1, a hit always occurs even if the next read command is a repeat access read request.

When a hit occurs with respect to the data D3 in FIG. 6F, since the address ADD-S is set, as a cache start buffer address, in the repeat cache management data portion 71 in the RAM 7 as shown in FIG. 9, the CPU 5 instructs the HDC 3 to sequentially read out the data D3, stored in the area of the buffer area 21 which extends from the head address ADD-S to the address ADD1, by the required number of sectors (blocks) and transfer the readout data to the host system (step S144). When a data shortage occurs with only the data D3, the CPU 5 instructs the HDC 3 to stop the ahead-read processing and to start the reading out disk data at the buffer address ADD1 during transferring of data D3 to the host system. That is, only the area of the buffer area 21 which extends from the address ADD1 to the end position is used to read requested data corresponding to the data shortage and the succeeding data thereinto.

If no repeat hit occurs (NO in step S112), the CPU 5 notifies the HDC 3 of the corresponding information. In response to this notification, the HDC 3 compares the requested disk address with the cache start disk address set in the sequential cache management data portion 31 in the HDC 3 to check whether the requested read processing is sequential access read (sequential read) processing.

If the requested read processing is sequential access read processing, the HDC 3 determines that the data corresponding to the sequential address is present in the buffer area 21, i.e., a sequential hit has occurred (step S114).

If, for example, the read request sent from the host system is a sequential access read request while the contents of the buffer area 21 are set in the state shown in FIG. 6B, a hit occurs with respect to the data D2 in FIG. 6B.

In this case, the address ADD2 is set as a cache start buffer address in the sequential cache management data portion 31 in the HDC 3, as shown in FIG. 7. The HDC 3 sequentially reads out the data D2, stored in the area of the buffer area 21 which starts from the address ADD2, from the address ADD2 by the required number of sectors (blocks), and transfers the readout data to the host system (step S134).

If a data shortage occurs with only the data D2, the succeeding requested data (corresponding to the data shortage) is read out from the magnetic disk 11 of the magnetic disk drive 1 while the data D2 is transferred to the host system. This succeeding requested data is read into the buffer area 21 from the address ADD1 to the end position (see FIG. 6E), and is transferred to the host system. Data corresponding to a sequential address following the requested data is read into the buffer area 21 from the address ADD1 to the end position (see FIG. 6F). Note that the set contents of the cache management data portions 31 and 71 are updated in step S150 in the same manner as that for the data D3 and D4 in FIG. 6F.

If the read request sent from the host system is a sequential access read request while the contents of the buffer area 21 are set in the state shown in FIG. 6F, a hit occurs with respect to the data D4 in FIG. 6F.

In this case, as shown in FIG. 9, the address ADD3 is set as a cache start buffer address in the sequential cache management data portion 31 in the HDC 3. For this reason, the HDC 3 sequentially reads out the data D4, stored in the area of the buffer area 21 which extends from the address ADD1 to the end position, from the address D3 by the requested number of sectors (blocks), and transfers the readout data to the host system.

If a data shortage occurs with only the data D4, requested data corresponding to the data shortage is read into the buffer area 21 from the position next to the last position of the data D4 read into the buffer area 21 to the end position of the buffer area 21, and is transferred to the host system. Data corresponding to the sequential address following the requested data is read into the buffer area 21 from the address ADD1 to the end position (see FIG. 6F).

If the read request is not for sequential access read processing, the HDC 3 notifies the CPU 5 of the corresponding information. The CPU 5 checks the presence/absence of any of other hits by checking whether the requested disk address falls within the disk address range obtained from the cache start disk address and the number of cache blocks (sectors) which are set in the repeat cache management data portion 71 in the RAM 7 (step S116).

If any of other hits is determined, the CPU 5 calculates the buffer address of the head (head sector) of the requested data stored in the buffer area 21 from the requested disk address and the cache start disk address and the cache start buffer address which are set in the repeat cache management data portion 71 in the RAM 7, and instructs the HDC 3 to sequentially read out the requested data, starting from the data corresponding to the buffer address, by the requested number of sectors (blocks) and transfer the readout data to the host system (step S152). If a data shortage occurs, requested data corresponding to the data shortage and the succeeding data are read from the magnetic disk 11 in the magnetic disk drive 1 into the buffer area 21, and the requested data is transferred to the host system, as described above.

The start buffer address of the sequential data area which is stored in the division data portion 72 will be described next.

As described above, the division data portion 72 stores the start buffer address of the sequential data area to manage the boundary between the repeat data area and the sequential data area included in the buffer area 21. In the process of manufacturing the magnetic disk system, this start buffer address is set in a predetermined area of the EEPROM 8 in advance. As a default value set in this area, a value considered, by the manufacturer of the magnetic disk system, to allow effective use of the buffer area 21 is set. The start buffer address set in the predetermined area of the EEPROM 8 is read out and set in the division data portion 72 every time the magnetic disk system is activated.

Even if the set start buffer address is considered, by the manufacturer of the magnetic disk system, to be a value allowing effective use of the buffer area 21, the value is not always a proper value depending on the environment in which the magnetic disk system is used and the method of using the system. More specifically, if sequential read processing is frequently requested by the host system, the sequential data area is preferably set to be large. In contrast to this, if repeat read processing is frequently requested, a larger repeat area will allow more efficient use of the buffer area 21.

In the magnetic disk system of the first embodiment, therefore, the start buffer address of the sequential data area can be changed in accordance with a specific command (to be referred to as an area size changing command hereinafter) from the host system.

Figure 11:
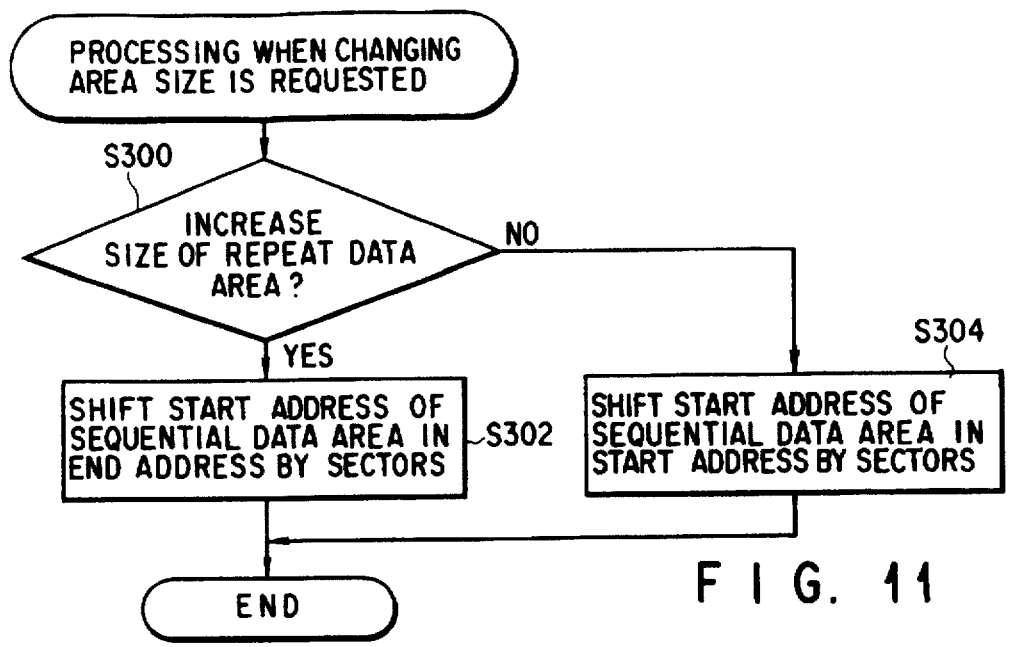
FIG. 11 is a flow chart for explaining processing to be performed in the magnetic disk system of the first embodiment when a request for changing each area size of the buffer area is received from the host system.

An operation to be performed when a request for changing the sizes of the repeat data area and the sequential data area is generated by the host system (an area size changing command is issued) will be described with reference to the flow chart of FIG. 11. Note that the processing shown in FIG. 11 corresponds to other command processing in step S108 shown in FIGS. 4A to 4C.

The area size changing command issued by the host system is sent to the CPU 5 via the host interface 4 and the HDC 3. Upon reception of this area size changing command, the CPU 5 checks whether the size changing request from the host system is a request for increasing the size of the repeat data area (step S300).

If the size changing request from the host system is a request for increasing the size of the repeat data area (YES in step S300), the CPU 5 shifts the start address of the sequential data area, which is set in the division data portion 72, by a predetermined number of sectors ($\alpha$ sectors) in the direction toward the end position of the buffer area 21 (step S302). That is, the CPU 5 adds a buffer address value corresponding to $\alpha$ sectors to the value of the start address of the sequential data area, and sets the resultant value as a new start address in the division data portion 72. With this operation, the size of the repeat data area increases by $\alpha$ sectors, whereas the size of the sequential data area decreases by $\alpha$ sectors. Note that this number ($\alpha$) of sectors by which the size of the sequential data area is decreased may be the number of sectors which is predetermined in the magnetic disk system. Also, the number of sectors may be sent from the host system to the magnetic disk system, together with the area size changing command.

After this operation, the CPU 5 terminates the processing corresponding to the reception of the area size changing command. Subsequently, even if repeat read processing is frequently requested by the host system, since a large repeat data area is ensured in the buffer area 21, the buffer area 21 can be effectively used. This improves the efficiency of data transfer to the host system.

If the size changing request from the host system is not a request for increasing the size of the repeat data area (NO in step S300), the CPU 5 shifts the start address of the sequential data area, which is set in the division data portion 72, by a predetermined number of sectors ($\beta$ sectors) in the direction toward the start position of the buffer area 21 (step S304). That is, the CPU 5 subtracts a buffer address value corresponding to $\beta$ sectors from the value of the start address of the sequential data area to set the resultant value as a new start address in the division data portion 72. With this operation, the size of the repeat data area decreases by $\beta$ sectors, whereas the size of the sequential data area increases by $\beta$ sectors. Note that the sector size $\beta$ by which the size of each data area is increased/decreased in step S304 may be set in the magnetic disk system or designated upon reception of a command from the host system, similar to the case of the sector size $\alpha$ described above.

After this operation, the CPU 5 terminates the processing corresponding to the reception of the area size changing command. Subsequently, even if sequential read processing is frequently requested, since a large sequential data area is ensured in the buffer area 21, the buffer area 21 can be effectively used. This improve the efficiency of data transferring to the host system.

In this processing, the host system for issuing an area size changing command must manage the size of requested data in requesting data read processing and the number of times that data read processing is requested, depending on the type of data read processing requested to the magnetic disk system, i.e., for every request for sequential read processing or repeat read processing. For example, the host system count the number of times that sequential read processing or repeat read processing is requested in a predetermined interval, and manages the sum total of request sizes for each type of data read processing. In accordance with these values, the host system issues an area size changing command for requesting an increase in the size of the repeat data area or the sequential data area.

As described in detail above, according to the first embodiment, when data read-out processing from a storage medium is performed in response to a read request from an external unit, the readout data is stored in an assigned area of a memory means from one end to the other end. After the readout data is stored in this area up to the other end, succeeding readout data is stored in this area from a predetermined storage position between one end and the other end of the area to the other end. With this arrangement, data (sequential data) following the requested data is present within the range of the assigned area (buffer or segment area) which extends from the predetermined storage position to the other end of the area, and at least the head portion of the requested data is present (without being overwritten by the succeeding data) on one side of the assigned area (the range from one end of the area to the predetermined storage position). Even if, therefore, the next read request from the external unit is a sequential access read request or repeat access read request, a hit occurs, thereby realizing an effective read cache function in either case.

A magnetic disk system according to the second embodiment of the present invention will be described next.

The operation of the magnetic disk system of the second embodiment is essentially the same as that of the first embodiment. In the second embodiment, however, the start address of the sequential data area can be autonomously changed in the magnetic disk system, unlike the first embodiment in which such a changing operation is performed in accordance with a special command (area size changing command) issued by the host system.

Figure 12:
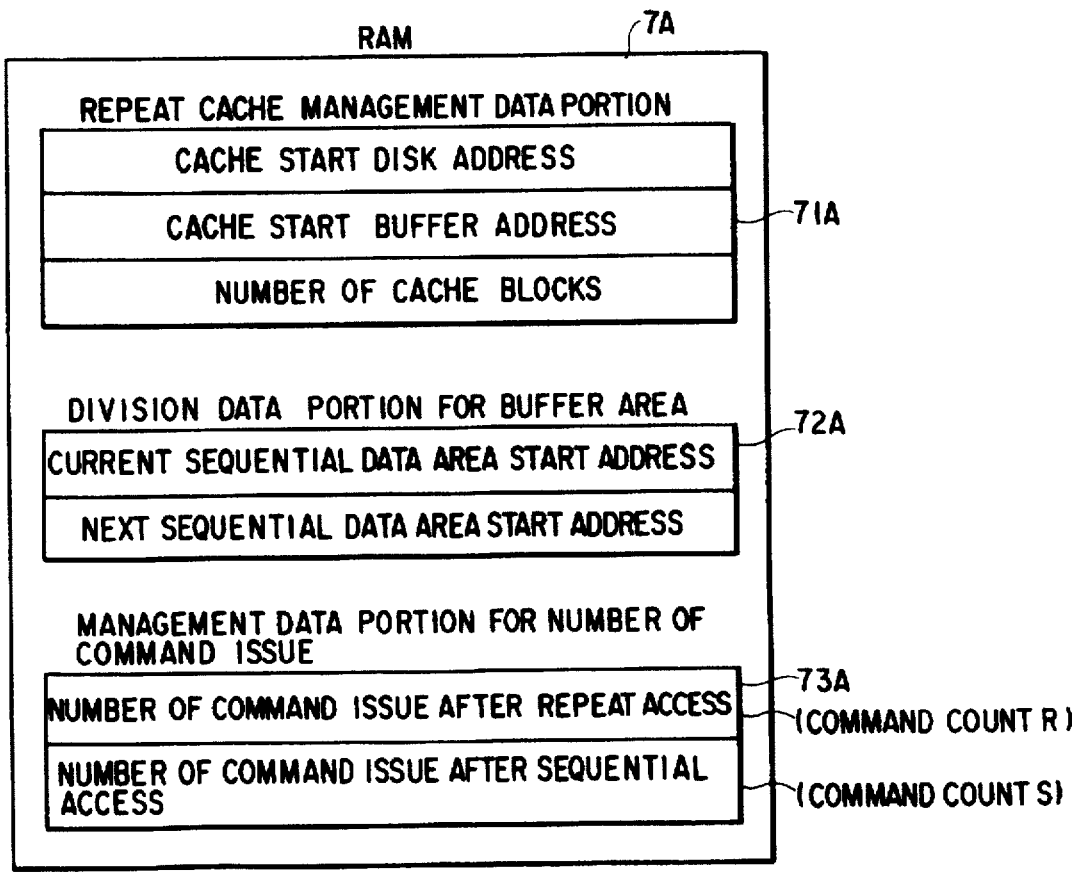
FIG. 12 is a view for explaining a repeat cache management data portion, a division data portion for buffer area, and a management data portion for number of issued commands which are held in the RAM in a magnetic disk system of the second embodiment.

Since the overall arrangement of the magnetic disk system of the second embodiment is the same as that of the magnetic disk system of the first embodiment shown in FIG. 1, a detailed description thereof will be omitted. As shown in FIG. 12, however, in the magnetic disk system of the second embodiment, since various types of information must be managed for each sequential read request and each repeat read request, an area for storing a sequential data area start address used for the next disk read processing is set in a division data portion 72A of a RAM 7A (corresponding to the RAM 7 in the first embodiment), and a management data portion 73A is also set to store the number of commands (command count R) issued after the latest repeat access, and the number of commands (command count S) issued after the latest sequential access. Therefore, the division data portion 72A stores not only the start address of a currently used (current) sequential data area but also the start address of a (next) sequential data area used to read out disk data from a magnetic disk 11.

A repeat cache management data portion 71A shown in FIG. 12 corresponds to the repeat cache management data portion 71 in the first embodiment, and the two portions store similar data. Therefore, a detailed description of the repeat cache management data portion 71A will be omitted.

Changing and setting processing of the start address of the sequential data area in the magnetic disk system will be described next in conjunction with FIG. 14 which is referred to for the description of the operation of the first embodiment. The overall operation of the magnetic disk system is almost the same as that shown in FIGS. 4A to 4C except for processing of autonomously changing and setting the start address of the sequential data area. This processing of changing and setting the start address of the sequential data area is executed by changing the processing within the chain line in FIGS. 4A to 4C in the manner shown in FIGS. 13A and 13B.

If a command sent to an HDC 3 and a CPU 5 is a read command (YES in step S102 in FIGS. 4A to 4C), the CPU 5 compares the cache start disk address held in the repeat cache management data portion 71A of the RAM 7A with the disk address designated by the received command to check whether a repeat hit occurs (step S400). If the cache disk address held in the repeat cache management data portion 71A does not coincide with the disk address designated by the command (NO in step S400), the CPU 5 increments the number of commands after repeat access which is set in the management data portion 73A (step S402).

If the cache disk address held in the repeat cache management data portion 71A coincides with the disk address designated by the command (YES in step S400), the CPU 5 resets a command count R held in the management data portion 73A, and increments a command count S held in the management data portion 73A by one (steps S404 and S406). Thereafter, the CPU 5 calculates the size of the current repeat data area from the cache start buffer address held in the repeat cache management data portion 71A and the current sequential data area start address held in the division data portion 72A, and compares the calculated size with the size of the requested data requested by the received read command (step S408). When the repeat data area is smaller in size than the requested data (NO in step S408), all the data requested by the host system may not always be stored in a buffer area 21 in some case. For this reason, the CPU 5 starts to transfer the requested data only stored in the buffer area 21 and stops the ahead-read processing if the ahead-read processing being executed. Further, the CPU 5 sets the current sequential data area start address in the division data portion 72A, which is to be referred to for the next disk data read-out processing, such that the size of the repeat data area is equal to or larger than that of the requested data designated by the command (step S410).

If the repeat data area is equal to or larger than the requested data (YES in step S408), a repeat hit occurs. The CPU 5 further compares the size of the repeat data area of the buffer area 21 with the size of the requested data designated by the command (step S412). If it is determined in step S412 that the repeat area of the buffer area 21 is much larger in size than the requested data designated by the command (if the difference therebetween is larger than a predetermined size difference; YES in step S412), it can be considered that even data which is not required by the host system is stored in the repeat data area in large amount. For this reason, the next sequential data area start address held in the division data portion 72A is set to decrease the size of the repeat data area of the buffer area 21 in data read-out processing from the magnetic disk (step S414).

If the difference in size between the repeat data area and the requested data designated by the command is not larger than a predetermined size difference (NO in step S412), or after a next sequential data area start address is set (step S414), the processing in step S144 shown in FIGS. 4A to 4C is executed.

If a repeat hit does not occur, the HDC 3 compares the cache start disk address held in a sequential cache management data portion 31 with the disk address designated by the received command (step S416). If the disk addresses coincide with each other (YES in step S416), the HDC 3 outputs a command to the CPU 5 to reset the command count S held in the management data portion 73A. In response to this command, the CPU 5 resets the command count S (step S418). Thereafter, the CPU 5 checks the size of the sequential data area (step S420). In this case, the CPU 5 compares the number of cache blocks (sectors) in the sequential cache management data portion 31 held in the HDC 3 with a predetermined number of blocks. If the number of cache blocks in the sequential cache management data portion 31 is smaller than the present number of blocks, it is determined that the size of the sequential data area of the buffer area 21 is too small to be efficiently used. Therefore, a sequential hit is not determined even though the disk addresses coincide with each other. The CPU 5 sets the next sequential data area start address in the division data portion 72A to increase the size of the sequential data area (step S422).

If the number of cache blocks held in the sequential cache management data portion 31 is equal to or higher than the predetermined number of blocks, a sequential hit is determined, and the processing in step S150 shown in FIGS. 4A to 4C is executed.

If it is determined in step S416 that the cache start disk address held in the sequential cache management data portion 31 does not coincide with the disk address designated by the received command (NO in step S416), the CPU 5 checks whether any of the disk data stored in the buffer area 21 is read-requested by the host system (step S424). This determination processing is the same as that in FIGS. 4A to 4C. If the head data of the requested data is stored in the buffer area 21 (YES in step S424), the processing in step S152 shown in FIGS. 4A to 4C is executed.

If it is determined that neither a repeat hit nor a sequential hit occurs with respect to the received read command, the CPU 5 outputs an instruction to stop reading out disk data during execution of ahead-read processing (step S426). Thereafter, the CPU 5 checks the number of read commands executed after execution of the latest repeat access, or the number of read commands executed after execution of the latest sequential access (steps S428 and S430). If neither the number of times of repeat access nor the number of times of sequential access is equal to or larger than a predetermined count value, i.e., neither the command count R nor the command count S is equal to or larger than the predetermined count value (NO in steps 428 and S430), the CPU 5 sets the next sequential data area start address in the division data portion 72A to an address which divides the buffer area 21 into equal areas (step S432).

If the command count R is smaller than the predetermined count value (NO in step S428), but the command count S is equal to or larger than the predetermined count value (YES in step S430), i.e., if "sequential over" is determined, the CPU 5 determines that there is no need to ensure a repeat data area in the buffer area 21, and sets the next sequential data area start address in the division data portion 72A to the start address (head) address of the buffer area 21 (step S434).

If the command count R held in the management data portion 73A is equal to or larger than the predetermined count value (YES in step S428), or after the processing in step S423 or S434, the CPU 5 copies the next sequential data area in the division data portion 72A to the start address of the current sequential data area. Thereafter, the processing in step S120 shown in FIGS. 4A to 4C is executed.

Subsequently, with this operation, the start address of the next sequential data area is made effective, and the repeat and sequential data areas corresponding to the command from the host system are set.

As described above, according to the magnetic disk system of the second embodiment, the host system need not be designed to issue an area size changing command of the first embodiment. In addition, in the magnetic disk system, a sequential data area and a repeat data area can be properly set in the buffer area 21 on the basis of the type of read command issued by the host system, the size of the data requested by this read command, and the number of times that each command is issued.

As in the first embodiment, in the second embodiment, when data is read out from a recording medium in response to a read request from an external unit, the readout data is stored in an assigned area of a memory means from one end to the other end. After the readout data is stored in this area up to the other end, succeeding readout data is stored in the area from a predetermined storage position between one end and the other end of the area to the other end. With this operation, the data (sequential data) following the requested data is present in the range of the assigned area (buffer or segment area) which extends from the predetermined storage position to the other end of the area, whereas at least the head portion of the requested data is present (without being overwritten by the succeeding data) on one end side of the assigned area (in the range extending from one end of the area to the predetermined storage position). Therefore, even if the next read request from the external unit is a sequential access read request or a repeat access read request, a hit occurs, thereby realizing an effective read cache function in either case.

The above-described first and second embodiments have exemplified the case wherein a given area of the buffer memory 2 is assigned as the only buffer area 21. In this scheme, if a succeeding read command does not hit data cached in the buffer area 21, since the newly requested data is read into the buffer area 21, the previously cached data is lost. After this operation, therefore, when a read command for requesting this lost data is sent from the host system, the data must be read into the buffer area 21 again.

As a scheme for solving this problem, a segment cache scheme (called a segment management scheme) is known. A magnetic disk system to which this segment cache scheme is applied will be described as the third embodiment of the present invention. Since the overall arrangement of the magnetic disk system of the third embodiment is the same as that of the first embodiment shown in FIG. 1, a detailed description of each constituent element will be omitted, but only different points will be described.

In the segment cache scheme, in response to a read command from the host system, a partial storage area (one of a plurality of storage areas ensured in the buffer memory) of the buffer memory is assigned as a segment (called a buffer area), and data is read into this segment (segment area), thereby allowing cache processing. If the succeeding read command does not hit the data cached in this segment, another storage area in the buffer memory is assigned, as a new segment, to this read command, and the data is read thereinto, thereby allowing cache processing. In this case, the data cached in the preceding segment is not lost. Therefore, when a read command for requesting this data is sent from the host system, a hit occurs with respect to this cached data (corresponding to any of other hits in step S116 in FIGS. 4A to 4C in the first embodiment), and the data can be immediately transferred to the host system. If there is no storage area to be newly assigned, an LRU (least recently used) scheme is used to select and assign one of the existing segments which has been used most previously.

The present invention can be applied to such segment cache processing. More specifically, when one of a plurality of storage areas (which are generally equal in size but may not be equal) in the buffer memory 2 in FIG. 1 is assigned as one segment (segment area) in response to a read command from the host system, the requested data may be read into the segment from the start position to the end position thereof. In this case, if the requested data exceeds the segment area, succeeding data may be read into the segment area from its middle point as the head of the area to the end position of the area.

In this case, the contents set in the sequential cache management data portion 31 and the buffer management data portion 32 of the HDC 3 in the first embodiment are the same as those in the segment cache scheme (except that a segment area is used in place of a buffer area).

In contrast to this, the repeat cache management data portion 71 in the RAM 7 in the first embodiment is different from an equivalent portion in the third embodiment. A cache management data portion (repeat and sequential cache management data portions) 71A in the third embodiment will be described below.

In the segment cache scheme, the cache management data portion 71A in a RAM 7A is prepared for each segment. In addition, the data structure of the cache management data portion 71A will be described below.

Assume that a segment (storage area) is assigned in response to a read command from the host system, and the requested data is to be read into the segment. In this case, immediately before the data read processing, the contents of a sequential cache management data portion 31 of an HDC 3 are updated to cache management data for the sequential data to be stored in the segment. Consequently, the cache management data for the sequential data in the previously assigned segment is lost. For this reason, in the third embodiment, the contents of the sequential cache management data portion 31 of the HDC 3 are also held in the cache management data portion 71A in the RAM 7A.

When, for example, data read processing like the one shown in FIG. 6B is to be performed with respect to a newly assigned segment, as in the first embodiment, cache management data (called repeat cache management data) consisting of the (head) disk address of data D1, a (head) buffer address ADD-S of the data D1, and the number of sectors (cache blocks) of data D5 is set in the cache management data portion 71A of the RAM 7A. In addition, the same information as that set in the sequential cache management data portion 31 in the HDC 3, i.e., cache management data (called sequential cache management data) consisting of the (head) disk address of succeeding data D2, a (head) buffer address ADD2 of the data D2, and the number of sectors of the data D2, is set in the cache management data portion 71A. However, in the case of the data read processing shown in FIG. 6B, since hit determination (determination of a repeat hit or any of other hits) (with respect to not only the data D1 but also the data D2) can be performed with only repeat cache management data, sequential cache management data need not always be set.

When data read processing like the one shown in FIG. 6F is performed with respect to a newly assigned segment, as in the above embodiments, first cache management data consisting of the disk address of data D3, a buffer address ADD-S of the data D3, and the number of segments (cache blocks) of the data D3 is set in the cache management data portion 71A in the RAM 7. In addition, the same information as that set in the sequential cache management data portion 31 in the HDC 3, i.e., sequential cache management data consisting of the disk address of succeeding data D4, a buffer address ADD3 of the data D4, and the number of segments of the data D4, is set in the cache management data portion 71A.

With this arrangement, when the HDC 3 determines that no sequential hit (sequential access read processing) occurs with respect to a read command from the host system, a CPU 5 can determine a repeat hit (repeat access read processing) or any other hit on the basis of the contents set in the cache management data portion 71A, in the RAM 7, which is prepared for each segment.

As described above, according to the third embodiment, when a succeeding read command does not hit the data cached in the segment set in the HDC 3, it is checked whether the command hits the data cached in any other segment. In addition, if a succeeding read command does not hit the data cached in this segment, another storage area in the buffer memory is assigned as a new segment to this read command, and the data is read thereinto. In this case, since the data cached in the preceding segment is not lost, when a read command for requesting this data is sent from the host system, the data which has been cached can be immediately transferred to the host system.

In the first and second embodiments, the following situation may occur. When a succeeding read command hits no data cached in the buffer area, newly requested data is read into this buffer area. Consequently, the previously cached data is lost. After this operation, when a read command for requesting this lost data is sent from the host system, the data must be read into the buffer area again. According to the third embodiment, such a situation can be avoided.

A magnetic disk system according to the fourth embodiment of the present invention will be described next.

In the third embodiment, the segment scheme is employed to set a plurality of segments in the storage area of the buffer memory and perform data storage control for each segment in the same manner as in the buffer area in the first embodiment. However, the storage area of the buffer memory is limited. If a large number of segments are set in the storage area, the size of each segment is small. For this reason, even if a hit occurs with respect to cached data in response to a read request from the host system, all the requested data is not always cached, and the requested data which has not been cached must be read out from the magnetic disk in many cases. It is, therefore, an object of the fourth embodiment to effectively use the limited storage area of a buffer memory in managing the storage area by the segment scheme. Since the overall arrangement of the magnetic disk system of the fourth embodiment is the same as that of the first embodiment, a detailed description thereof will be omitted, and only different points will be described.

The data stored in the sequential data area in the buffer area (each segment area) is data for ahead-cache processing (read ahead data in expectation of being accessed next), which becomes unnecessary when no hit occurs in response to the next read command. In contrast to this, the data stored in the repeat data area is data which has been requested by the reproduction read command from the host system, and the probability that this data is read-requested again is high. It is, therefore, preferable that the data be stored in the buffer area (segment area).

In the fourth embodiment, therefore, when the segment scheme is to be employed, a sequential data area set for each segment area is assigned to a common storage area, and a common sequential data area is set for each segment area. That is, the storage other than the area assigned as the common sequential data area is assigned as a repeat data area. With this arrangement, in managing the limited storage area of the buffer memory by the segment scheme, a large repeat data area can be set, and data for repeat cache processing can be stored in large amount.

Data storage control in the fourth embodiment will be described next with reference to FIGS. 14A and 14B in comparison with the third embodiment. FIG. 14A shows the state of the buffer area subjected to data storage control based on the third embodiment. FIGS. 4A to 4C shows the state of the buffer area subjected to data storage control based on the fourth embodiment.

FIG. 14A shows a state wherein buffer addresses ADD-S1 to ADD-E2 correspond to a continuous storage area, and two segments having equal storage areas are set (the addresses ADD4 and ADD5 are variable). In performing the first data read-out processing after the magnetic disk system is activated, segment #1 having the buffer addresses ADD-S1 to ADD-E1 is used to read data from the magnetic disk thereinto. This data readout processing is the same as that in the first embodiment described above. When requested data is larger in size than segment #1, the data is read into the segment in the manner shown in FIG. 14A. When a read command is issued afterward, and no hit occurs with respect to the data cached in segment #1, the same data read processing is performed with respect to segment #2 having the buffer addresses ADD-S2 to ADD-E2, as shown in FIG. 14A. If two segments are set in the buffer area (the storage area of the buffer memory), and storage control is performed on the basis of the third embodiment, the size of the repeat data area of each segment is ¼ the size of the buffer area.

In contrast to this, as shown in FIG. 14B, an area having buffer addresses ADD7 to ADD-E2 is set as a common sequential data area for each segment. In this case as well, two segments having equal storage areas are set. In performing the first data read-out processing after the magnetic disk system is activated, segment #1 having the buffer addresses ADD-S1 to ADD-E3 and ADD6 to ADD-E2 is used to read data from the magnetic disk system thereinto. In this case, when the requested data is larger in size than segment #1, data read processing is performed in the manner shown in FIG. 14B.

When a read command is issued afterward, and no hit occurs with respect to the data cached in segment #1, the same data read processing is performed with respect to the buffer addresses ADD-S3 to ADD-E4 and ADD6 to ADD-E2. FIG. 14B shows data read processing to be performed when requested data is larger in size than segment #2. When storage of data with respect to the buffer area is controlled in this manner, a repeat data area having a size ⅓ that of the buffer area can be ensured for each segment.

As described above, according to the fourth embodiment, in employing the segment scheme, a sequential data area set for each segment area is assigned to a common storage area, and the storage area other than the area assigned as the common sequential data area is assigned as a repeat data area. With this arrangement, in managing the limited storage area of the buffer memory by the segment scheme, a large repeat data area can be set, and hence data for repeat cache processing can be stored in large amount. Therefore, data requested by a repeat access request from the host system can be transferred at a high speed.

In the fourth embodiment, consecutive addresses are assigned to each segment or the repeat data area and the common sequential data area. However, the present invention is not limited to this. For example, a common sequential data area may be set from the buffer address ADD-S1 in FIG. 14A. Also, the buffer addresses ADD-E3 (or ADD-S3) and ADD-E4 (or ADD6) may be made variable to change the sizes of the repeat area of each segment and the common sequential data area.

In the first to fourth embodiments, the present invention is applied to the magnetic disk systems. However, the present invention is not limited to this. The present invention can be applied to disk systems such as magneto-optical disk systems other than magnetic disk systems.

As has been described above, according to the disk system of the present invention, when data is read out from a storage medium such as a magnetic disk in response to a read request from an external unit (host system), the readout data is stored in the assigned area of the buffer memory from one end to the other end. After the readout data is stored in this area up to the other end, succeeding readout data is stored in this area from a predetermined storage position between one end and the other end of the area to the other end. The data (sequential data) following the requested data is present in the range of the assigned area (buffer or segment area) which extends from the predetermined storage position to the other end of the area, whereas at least the head portion of the requested data is present (without being overwritten by the succeeding data) on one end side (the range from one end of the area to the predetermined storage position) of the assigned area. Even if, therefore, the next read request from the external unit is a sequential access read request or a repeat access read request, a hit occurs, thereby realizing an effective read cache function in either case.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A disk system comprising:
    a disk for storing data;
    a buffer divided into a plurality of segments, for temporarily storing data read out from said disk;
    a memory for storing a start address, an end address and a wrap address of each of said plurality of segments, the wrap address being set between the start address and the end address inclusive;
    a controller which comprises:
        a first register in which an address is to be set,
        a second register in which an address is to be set, and
        a third register in which an address is to be set, which is to be accessed next when the address set in said second register is accessed; and
    a processor which comprises:
        selection means for selecting a segment of said plurality of segments in response to a read command issued by a host system to which said disk system is connected, and
        setting means, in response to the read command, for setting the start address, the end address, and the wrap address of the selected segment into the first register, the second register, and the third register respectively;
    wherein said controller comprises:
        reading means having a read ahead cache function, for reading out data from said disk according to the read command,
        storage means for sequentially storing the data read out by said reading means into the selected segment from the start address of the first register in a direction to the end address of the second register, and storing succeeding readout data from the wrap address of the third register in a direction to the end address of the second register,
        transferring means for transferring the data stored in the selected segment to the host system successively, and
        means for, when an address is accessed by said storage means, if data at the accessed address has not been transferred by said transferring means, stopping data storing at the address accessed by said storage means until the data at the accessed address is transferred by said transferring means.

2. A system according to claim 1, wherein said setting means includes means for changing the wrap address of the third register in response to a request from the host system.

3. A system according to claim 1, wherein said setting means includes means for changing the wrap address according to at least one of a data size which is designated by the read command and a number of read commands issued by the host system, the read command being either a sequential read command or a repeat read command.

4. A system according to claim 3, wherein said setting means includes means for setting the wrap address of the selected segment into the first register.

5. A disk system comprising:
    a disk for storing data;
    a buffer for temporarily storing data read out from said disk;
    a memory for storing a start address, an end address and a wrap address of said buffer, the wrap address being set between the start address and the end address inclusive;
    a controller which comprises:
        a first register in which an address is to be set,
        a second register in which an address is to be set, and
        a third register in which an address is to be set, which is to be accessed next when the address set in said second register is accessed; and
    a processor having setting means, in response to a read command which is issued by a host system to which said disk system is connected, for setting the start address, the end address, and the wrap address of said buffer into the first register, the second register, and the third register respectively;
    wherein said controller comprises:
        reading means having a read ahead cache function, for reading out data from said disk according to the read command, storage means for sequentially storing the data read out by said reading means into said buffer from the start address of the first register in a direction to the end address of the second register, and storing succeeding readout data from the wrap address of the third register in a direction to the end address of the second register, transferring means for transferring the data stored in said buffer to the host system successively, and means for, when an address is accessed by said storage means, if data at the accessed address has not been transferred by said transferring means, stopping data storing at the address accessed by said storage means until the data at the accessed address is transferred by said transferring means.

6. A system according to claim 5, wherein said setting means includes means for changing the wrap address of the third register in response to a request from the host system.

7. A system according to claim 5, wherein said setting means includes means for changing the wrap address of the third register according to at least one of a data size which is designated by the read command and a number of read commands issued by the host system, the read command being either a sequential read command or a repeat read command.

8. A system according to claim 7, wherein said setting means includes means for setting the wrap address of said buffer into said first register.

9. A disk system comprising:
a disk for storing data;
a buffer including a plurality of repeat segments and a common segment, for temporarily storing data sequentially read out from said disk;
a memory for storing a start address and an end address of each of said plurality of repeat segments, and a start address and an end address of the common segment;
a controller which comprises:
a first register in which an address is to be set,
a second register in which an address is to be set,
a third register in which an address is to be set, and
a fourth register in which an address is to be set, which is to be accessed next both when the address set in said second register is accessed and when the address set in said third register is accessed; and
a processor which comprises:
selection means for selecting a segment of said plurality of repeat segments in response to a read command issued by a host system to which said disk system is connected, and
setting means, in response to a read command, for setting the start address and the end address of the selected segment into said first register and said second register respectively, and for setting the end address and start address of the common segment into said third register and fourth register respectively,
wherein said controller comprises:
reading means having a read ahead cache function, for reading out data from said disk according to the read command,
storage means for sequentially storing the data read out by said reading means into said buffer from the start address of the first register in a direction to the end address of said second register, and storing succeeding readout data from the start address of the fourth register in a direction to the end address of the third register, transferring means for transferring the data stored in said buffer to the host system successively, and means for, when an address is accessed by said storage means, if data at the accessed address has not been transferred by said transferring means, stopping data storing at the address accessed by said storage means until the data at the accessed address is transferred by said transferring means.

10. A data storage control method in a disk system connected to a host system and having a disk for storing data, a buffer divided into a plurality of segments, for temporarily storing data read out from said disk, a first register in which a first address is to be set, a second register in which an address is to be set, a third register in which an address is to be set, which is to be accessed next when the address set in said second register is accessed, and a read ahead cache function, said method comprising the steps of:

selecting a segment of the plurality of segments in response to a read command issued by the host system;

reading out data from the disk according to the read command;

setting in response to the read command, a start address, an end address and a wrap address of the selected segment into the first register, the second register and the third register respectively, the wrap address being set between the start address and the end address inclusive;

sequentially storing the data read out by said reading step into the selected segment from the start address of the first register in a direction to the end address of the second register, and storing succeeding readout data from the wrap address of the third register in a direction to the end address of the second register;

transferring the data stored in the selected segment to the host system successively; and when an address is accessed by said storing step, if data at the accessed address has not been transferred by said transferring step, stopping data storing at the address accessed by said storing step until the data at the accessed address is transferred by said transferring step.

11. A system according to claim 10, wherein said setting step comprises a substep of changing the wrap address of the third register in response to a request from the host system.

12. A method according to claim 10, wherein said setting step comprises a substep of changing the wrap address of the third register according to at least one of a data size which is designated by the read command and a number of read commands issued by the host system, the read command being either a sequential read command or a repeat read command.

13. A method according to claim 12, wherein said setting step comprises a substep of setting the wrap address of the selected segment into the first register.

14. A data storage control method in a disk system connected to a host system and having a disk for storing data, a buffer for temporarily storing data read out from said disk, a first register in which an address is to be set, a second register in which an address is to be set, a third register in which an address is to be set, which is to be accessed next when the address set in said second register is accessed, and a read ahead cache function, said method comprising the steps of:

reading out data from the disk according to a read command which is issued by the host system;

setting, in response to the read command, a start address, an end address and a wrap address of the buffer into the first register, the second register and the third register respectively, the wrap address being set between the start address and the end address inclusive;

sequentially storing the data read out by said reading step into the buffer from the start address of the first register in a direction to the end address of the second register, and storing succeeding readout data from the wrap address of the third register in a direction to the end address of the second register;

transferring the data stored in the buffer to the host system successively; and when an address is accessed by said storing step, if data at the accessed address has not been transferred by said transferring step, stopping data storing at the address accessed by said storing step until the data at the accessed address is transferred by said transferring step.

15. A system according to claim 14, wherein said setting step comprises a substep of changing the wrap address of the third register in response to a request from the host system.

16. A method according to claim 14, wherein said setting step comprises a substep of changing the wrap address of the third register according to at least one of a data size which is designated by the read command and a number of read commands issued by the host system, the read command being either a sequential read command or a repeat read command.

17. A system according to claim 16, wherein said setting step comprises a substep of setting the wrap address of the buffer into the first register.

18. A data storage control method in a disk system connected to a host system and having a disk for storing data, a buffer including a plurality of repeat segments and a common segment, for temporarily storing data read out from said disk, a first register in which an address is to be set, a second register in which an address is to be set, a third register in which an address is to be set, a fourth register in which an address is to be set, which is to be accessed next both when the address set in the second register is accessed and when the address set in the third register is accessed, and a read ahead cache function, said method comprising the steps of:

selecting a segment of the plurality of repeat segments in response to a read command issued by the host system;

setting, in response to the read command, a start address and an end address of the selected segment into the first register and the second register respectively, and an end address and start address of the common segment into the third register and fourth register respectively;

reading out data from the disk according to the read command;

sequentially storing the data read out by said reading step into the buffer from the start address of the first register in a direction to the end address of the second register, and storing succeeding readout data from the start address of the fourth register in a direction to the end address of the third register;

transferring the data stored in the buffer to the host system successively; and when an address is accessed by said storing step, if data at the accessed address has not been transferred by said transferring step, stopping data storing at the address accessed by said storing step until the data at the accessed address is transferred by said transferring step.

* * * * *